US008476392B2

(12) United States Patent
Kolb et al.

(10) Patent No.: US 8,476,392 B2
(45) Date of Patent: Jul. 2, 2013

(54) POLYMERIZATION PROCESSES USING METALLOCENE CATALYSTS, THEIR POLYMER PRODUCTS AND END USES

(75) Inventors: Rainer Kolb, Kingwood, TX (US); Agapios K. Agapiou, Humble, TX (US); James M. Farley, League City, TX (US); Eric J. Markel, Kingwood, TX (US); Bruce J. Savatsky, Kingwood, TX (US); Christopher R. Davey, Houston, TX (US); Richard B. Pannell, Kingwood, TX (US)

(73) Assignee: Univation Technologies, LLC, Houston, TX (US)

( * ) Notice: Subject to any disclaimer, the term of this patent is extended or adjusted under 35 U.S.C. 154(b) by 181 days.

(21) Appl. No.: 12/910,482

(22) Filed: Oct. 22, 2010

(65) Prior Publication Data

US 2011/0040041 A1 Feb. 17, 2011

Related U.S. Application Data

(62) Division of application No. 11/810,988, filed on Jun. 7, 2007, now Pat. No. 8,084,560.

(60) Provisional application No. 60/816,841, filed on Jun. 27, 2006, provisional application No. 60/858,825, filed on Nov. 14, 2006.

(51) Int. Cl.
*C08F 4/76* (2006.01)
*C08F 4/64* (2006.01)
*C08F 210/02* (2006.01)

(52) U.S. Cl.
USPC ............ 526/328; 525/240; 526/183; 526/348

(58) Field of Classification Search
USPC .................................. 526/348, 183; 525/240
See application file for complete search history.

(56) References Cited

U.S. PATENT DOCUMENTS

| | | | |
|---|---|---|---|
| 4,933,149 A | 6/1990 | Rhee et al. | |
| 5,436,304 A | 7/1995 | Griffin et al. | |
| 6,143,854 A | 11/2000 | Bamberger et al. | |
| 6,339,134 B1 | 1/2002 | Crowther et al. | |
| 6,448,341 B1 | 9/2002 | Kolthammer et al. | |
| 6,608,149 B2 | 8/2003 | Mawson et al. | |
| 6,831,140 B2 | 12/2004 | Muhle et al. | |
| 6,914,027 B2 | 7/2005 | Patrick et al. | |
| 6,936,675 B2 | 8/2005 | Szul et al. | |
| 6,987,152 B1 | 1/2006 | Eisinger et al. | |
| 7,078,467 B1 | 7/2006 | Kolb et al. | |
| 7,875,690 B2 | 1/2011 | Graham et al. | |
| 8,067,518 B2 | 11/2011 | Davey et al. | |
| 2003/0194575 A1 | 10/2003 | Tau et al. | |
| 2005/0054791 A1 | 3/2005 | Nowlin et al. | |
| 2005/0058847 A1 * | 3/2005 | Szul et al. | 428/523 |
| 2005/0124487 A1 | 6/2005 | Agapiou et al. | |
| 2005/0137364 A1 | 6/2005 | Cai et al. | |
| 2005/0288443 A1 | 12/2005 | Mavridis et al. | |
| 2007/0092704 A1 * | 4/2007 | Patel et al. | 428/212 |
| 2008/0021183 A1 | 1/2008 | Graham et al. | |
| 2008/0045663 A1 | 2/2008 | Kolb et al. | |
| 2008/0045679 A1 | 2/2008 | Davey et al. | |
| 2011/0086990 A1 | 4/2011 | Graham et al. | |

FOREIGN PATENT DOCUMENTS

| | | |
|---|---|---|
| EP | 0342032 | 10/1994 |
| EP | 1300240 | 4/2003 |
| EP | 1416001 | 5/2004 |
| EP | 1153948 | 11/2004 |
| WO | WO 96/00245 | 1/1996 |
| WO | WO 97/03139 | 1/1997 |
| WO | WO 99/29737 | 6/1999 |
| WO | WO 03/008468 | 1/2003 |
| WO | WO 03/093332 | 11/2003 |
| WO | WO 2004/000919 | 12/2003 |
| WO | WO 2006/001588 | 1/2006 |
| WO | WO 2006/120418 | 11/2006 |

OTHER PUBLICATIONS

Davey et al., Paper given at presentation "Engineered Catalyst for Controlled Bimodal Structures in UNIPOL Single Reactor Gas Phase Polyethylene." (Feb. 25-27, 2002), Houston, TX.
Davey et al., Paper given at presentation "Univation Technology's Advanced Catalysts for BOCD LLDPE Beyond Conventional Structure-Property Concepts." pp. 1-25 (May 13, 2004), Houston, TX.
Davey et al., Slides at presentation "Engineered Catalyst for Controlled Bimodal Structures in UNIPOL Single Reactor Gas Phase Polyethylene." (Feb. 25-27, 2002), Houston, TX.
Davey et al., Slides at presentation "Univation Technologies' Advanced Catalysts for BOCD LLDPE Beyond Conventional Structure-Property Concepts." (May 13, 2004), Houston, TX.
Farley et al., Slides at presentation "*Metallocene-Catalyzed Polyethylenes for the Global LLDPE Markets.*" (2005), Houston, TX.
Farley, Published article "*Metallocene-Catalyzed Polyethylenes for the Global LLDPE Market.*" SPE Conference (Feb. 2005).

* cited by examiner

*Primary Examiner* — Ling Choi
*Assistant Examiner* — Chun-Cheng Wang
(74) *Attorney, Agent, or Firm* — Jennifer A. Schmidt; Leandro Arechederra, III; Kristina Leavitt

(57) ABSTRACT

A process for the production of an ethylene alpha-olefin copolymer is disclosed, the process including polymerizing ethylene and at least one alpha-olefin by contacting the ethylene and the at least one alpha-olefin with a metallocene catalyst in at least one gas phase reactor at a reactor pressure of from 0.7 to 70 bar and a reactor temperature of from 20° C. to 150° C. to form an ethylene alpha-olefin copolymer. The resulting ethylene alpha-olefin copolymer may have a density D of 0.927 g/cc or less, a melt index ($I_2$) of from 0.1 to 100 dg/min, a MWD of from 1.5 to 5.0. The resulting ethylene alpha-olefin copolymer may also have a peak melting temperature $T_{max\ second\ melt}$ satisfying the following relation: $T_{max\ second\ melt} > D*398-245$.

20 Claims, 9 Drawing Sheets

POLYMERIZATION PROCESSES USING METALLOCENE CATALYSTS, THEIR POLYMER PRODUCTS AND END USES

CROSS-REFERENCE TO RELATED APPLICATIONS

The present application is a divisional application of Ser. No. 11/810,988, filed Jun. 7, 2007, now pending, which claims the benefit of Ser. Nos. 60/816,841, filed Jun. 27, 2006, and 60/858,825, filed Nov 14, 2006, the disclosures of which are herein incorporated by reference in their entireties.

BACKGROUND OF INVENTION

1. Field of the Invention

The invention relates generally to a process for polyolefin manufacturing in gas-phase fluidized bed polymerization reactors and polyolefins manufactured therefrom.

2. Background

Recent advances in polymerization and catalysis have resulted in the ability to produce many new polymers having improved physical and chemical properties useful in a wide variety of superior products and applications. Regardless of these technological advances in the polyolefin industry, common problems, as well as new challenges still exist.

Advances in polymerization technology have provided more efficient, highly productive, and economically enhanced processes. Especially illustrative of these advances is the development of single site catalyst systems. Single site catalysts have been shown to be highly useful in the preparation of polyolefins, producing relatively homogeneous copolymers at good polymerization rates, allowing one to closely tailor the final properties of the polymer produced. In contrast to traditional Ziegler-Natta catalyst compositions, single site catalyst compositions comprise catalytic compounds in which each catalyst composition molecule contains one or only a few polymerization sites. Metallocenes are the most well known type of single site catalyst precursor, and are organometallic coordination complexes containing one or more pi-bonded moieties (e.g., cycloalkadienyl groups) in association with a metal atom from Groups IIIB to VIII or the Lanthanide series of the Periodic Table of Elements.

There has been tremendous focus in the industry on developing new and improved metallocene catalyst systems, designing the catalyst systems to produce new polymers, to improve operability or processability, and to improve catalyst productivity. Metallocene catalyst variables include the metal atom, the ligands or pi-bonded moieties associated with the metal atom, the type of catalyst support used, as well as any catalyst activator and the reduction ratio of the catalyst or catalyst precursors.

Unfortunately, improving upon the productivity, operability, processability, and economics of a polymerization process entails overcoming several obstacles, especially when introducing a new catalyst. A few of these issues are discussed in patents and published patent applications including: U.S. Pat. No. 6,339,134, discussing ways to improve melt properties of metallocene produce polymers; U.S. Pat. No. 6,987,152, discussing the effect of feed impurities upon the process; U.S. Pat. No. 6,914,027, discussing fines production, sheeting/fouling, and their related heat transfer problems; and U.S. Patent Application Publication No. 2005/0137364, discussing problems associated with heat removal from the polymerization reactor; each of which is hereby incorporated by reference. Each of these references, among others, describes common problems encountered and which are of concern when introducing a new catalyst to the process due to the unpredictability of results associated with a new catalyst or catalyst system For example, the processability of metallocene and metallocene-type catalyzed polyethylenes (mPE) is often different than polyethylenes produced in a high pressure polymerization process or with other catalysts, such as Ziegler-Natta type catalysts. For example, mPEs typically have a narrow molecular weight distribution, which tend to be more difficult to process. Generally, the broader the polymer molecular weight distribution, the easier the polymer is to process. These examples illustrate the challenges to be encountered when commercializing a new catalyst system.

Generally, these mPEs require more motor power and produce higher extruder pressures to match the extrusion rate of LDPEs. Typical mPEs also have lower melt strength which, for example, adversely affects bubble stability during blown film extrusion, and they are prone to melt fracture at commercial shear rates. On the other hand, mPEs exhibit many superior physical properties as compared to LDPEs.

Additionally, reactor conditions and the catalyst employed in the polymerization affect numerous physical and chemical properties of the polymer, including molecular weight, molecular weight distribution, compositional distribution, crystallinity and melting temperature, and extractable content (e.g. hexane extractables), among others. In addition to the several reactor and reactant process control variables which may be manipulated during production, polymer product properties may also vary based upon catalyst formulation and structure. The metal atom and the ligands (pi-bonded moieties) forming the metallocene complex can affect the properties of the polymer product formed. The support architecture, the number of functional groups on the support (such as —OH groups on silica), the activator loading, and the pre-impregnated catalyst loading can also affect the product formed.

End users often desire improvements or a balancing of several polymer properties. Among these are included melting point for a given density, tear properties, impact and tensile strength, heat seal and hot tack properties, and others. For example, there is a strong desire in the industry to improve heat seal and hot tack properties in PE films. It is particularly desirable to lower the heat seal temperature, broaden the hot tack window and increase the hot tack strength while maintaining low extractables to meet regulatory requirements for food packaging. These improvements are usually accomplished by lowering the density of the film resin. This, however, may negatively affect other film properties such as tear strength, dart impact strength, stiffness, and it lowers the melting temperature of the film. Additionally, to achieve good clarity, low haze, and better processability, metallocene resins are often blended with high pressure LDPE, adding to manufacturing costs.

Other background references include EP 1 153, 948 A1, EP 1 416 001 A1, WO 1999/29737, WO 2004/000919, U.S. Patent Application Publication Nos. 2003/194575, 2005/0058847, 2005/054791, and U.S. Pat. No. 6,448,341.

Metallocene derived resins have many advantageous properties that provide commercially attractive products. Accordingly, there exists a need for low and medium density polyethylenes having improved properties.

SUMMARY OF INVENTION

In one aspect, the present invention relates to improvements in catalyst technology and polymer properties. These improvements may also allow for improved polymer processability.

In one aspect, the present invention relates to a process for the production of an ethylene alpha-olefin copolymer. The process may include polymerizing ethylene and at least one alpha-olefin by contacting the ethylene and the at least one alpha-olefin with a metallocene catalyst in at least one gas phase reactor at a reactor pressure of between 0.7 and 70 bar and a reactor temperature of between 20° C. and 150° C. to form an ethylene alpha-olefin copolymer. The resulting ethylene alpha-olefin copolymer may have a density D of 0.927 g/cc or less, a melt index ($I_2$) of between 0.1 and 100 dg/min, a MWD of between 1.5 and 5.0, and a peak melting temperature $T_{max\,second\,melt}$ satisfying the following relation:

$$T_{max\,second\,melt} > D*398-245.$$

In another aspect, the present invention relates to a process for the production of an ethylene alpha-olefin copolymer. The process may include polymerizing ethylene and at least one alpha-olefin by contacting the ethylene and the at least one alpha-olefin with a metallocene catalyst in at least one gas phase reactor at a reactor pressure of between 0.7 and 70 bar and a reactor temperature of between 20° C. and 150° C. to form an ethylene alpha-olefin copolymer. The resulting ethylene alpha-olefin copolymer may have a density D of 0.927 g/cc or less, a melt index ($I_2$) of between 0.1 and 100 dg/min, a MWD of between 1.5 and 5.0, and a peak melting temperature $T_{max\,first\,melt}$ satisfying the following relation:

$$T_{max\,first\,melt} > D*398-245.$$

In another aspect, the present invention relates to an ethylene alpha-olefin copolymer obtained by contacting ethylene, at least one alpha-olefin, and a metallocene catalyst in at least one gas-phase reactor. The ethylene alpha-olefin copolymer may have: a density of 0.927 g/cc or less; a melt flow index between 0.1 and 100 g/10 min; a molecular weight distribution between 1.5 and 5.0; and a peak melting $T_{max\,second\,melt}$ satisfying the following relation:

$$T_{max\,second\,melt} > D*398-245.$$

In another aspect, the present invention relates to a film formed from an ethylene alpha-olefin copolymer obtained by contacting ethylene, at least one alpha-olefin, and a metallocene catalyst in at least one gas-phase reactor. The film may have: an MD tear strength of 120 g/mil or greater; a dart impact strength of 500 g/mil or greater; a heat seal initiation temperature of 85° C. or less; and a density D and a peak melting temperature $T_{max\,second\,melt}$ satisfying the following relation:

$$T_{max\,second\,melt} > D*398-245.$$

In yet another aspect, the present invention relates to a process for the production of an ethylene alpha-olefin copolymer having a broad orthogonal composition distribution (BOCD). The process may include polymerizing ethylene and at least one alpha-olefin by contacting the ethylene and the at least one alpha-olefin with a metallocene catalyst in at least one gas phase reactor at a reactor pressure of between 0.7 and 70 bar and a reactor temperature of between 20° C. and 150° C. to form an ethylene alpha-olefin copolymer. The resulting ethylene alpha-olefin copolymer may have a density D of 0.927 g/cc or less, a melt index ($I_2$) of between 0.1 and 100 dg/min, a MWD of between 1.5 and 5.0, and a BOCD evidenced by a $T_{75}$–$T_{25}$ value of greater than 15 and a $M_{60}/M_{90}$ value of greater than 1, wherein $T_{25}$ is the temperature at which 25% of the eluted polymer is obtained and $T_{75}$ is the temperature at which 75% of the eluted polymer is obtained in a TREF experiment, and, wherein $M_{60}$ is the molecular weight of the polymer fraction that elutes at 60° C. and $M_{90}$ is the molecular weight of the polymer fraction that elutes at 90° C. in a TREF-LS experiment.

In yet another aspect, the present invention relates to an ethylene alpha-olefin copolymer. The ethylene alpha-olefin copolymer may have: a density of 0.927 g/cc or less; a melt flow index between 0.1 and 100 g/10 min; a molecular weight distribution between 1.5 and 5.0; and a BOCD evidenced by a $T_{75}$–$T_{25}$ value of greater than 15 and a $M_{60}/M_{90}$ value of greater than 1, wherein $T_{25}$ is the temperature at which 25% of the eluted polymer is obtained and $T_{75}$ is the temperature at which 75% of the eluted polymer is obtained in a TREF experiment, and, wherein $M_{60}$ is the molecular weight of the polymer fraction that elutes at 60° C. and $M_{90}$ is the molecular weight of the polymer fraction that elutes at 90° C. in a TREF-LS experiment.

Other aspects and advantages of the invention will be apparent from the following description and the appended claims.

DETAILED DESCRIPTION

Figure 1:
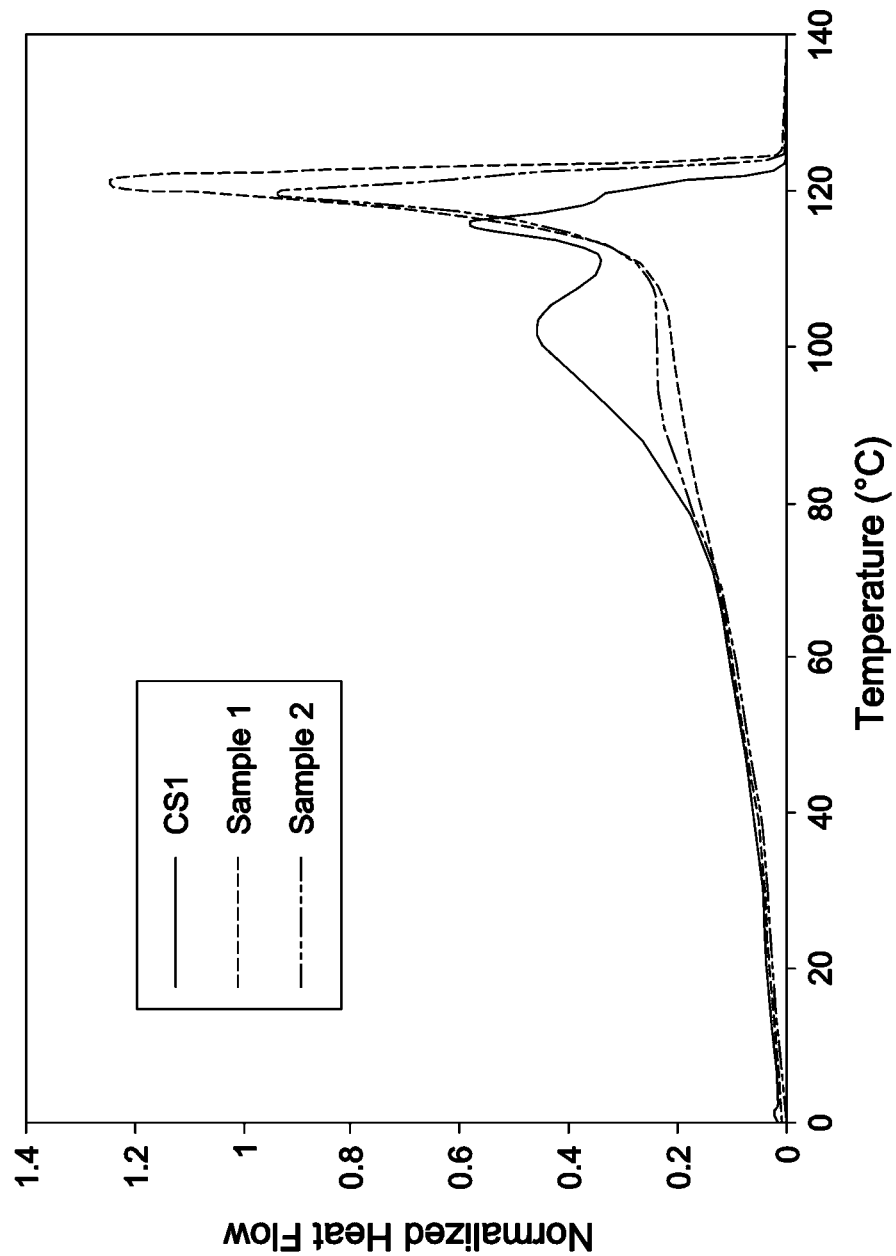
FIG. 1 presents differential scanning calorimetry results for embodiments of the inventive metallocene-produced copolymer described herein as compared to metallocene-produced copolymers of similar density and melt index.

In one aspect, embodiments of the invention relate to metallocene catalysts and processes for producing a polymer. In particular, embodiments of this invention relate to the production of ethylene alpha-olefin copolymers as well as improvements in the properties of the resulting ethylene alpha-olefin copolymer.

In other embodiments, the invention relates to metallocene catalysts and polymerization processes for producing a metallocene polyethylene having an increased melting point. In other aspects, embodiments disclosed herein relate to an ethylene alpha-olefin copolymer having a lower seal initiation temperature. Other embodiments relate to an alpha-olefin copolymer having a broader hot tack window.

Metallocene Catalyst Compounds

The metallocene catalyst compounds as described herein include "half sandwich" and "full sandwich" compounds having one or more Cp ligands (cyclopentadienyl and ligands isolobal to cyclopentadienyl) bound to at least one Group 3 to Group 12 metal atom, and one or more leaving groups bound to the at least one metal atom. Hereinafter, these compounds will be referred to as "metallocenes" or "metallocene catalyst components". The metallocene catalyst component may be supported on a support material, as described further below, and may be supported with or without another catalyst component. In one embodiment, the one or more metallocene catalyst components of the invention are represented by the formula (I):

$$Cp^A Cp^B MX_n \qquad (I)$$

wherein M is a metal atom selected from the group consisting of Groups 3 through 12 atoms and lanthanide Group atoms in one embodiment. In other embodiments, M may be selected from Ti, Zr, Hf atoms. In yet other embodiments, M is hafnium (Hf). Each leaving group X is chemically bonded to M; each Cp group is chemically bonded to M; and n is 0 or an integer from 1 to 4, and either 1 or 2 in a particular embodiment.

The Cp ligands are one or more rings or ring systems, at least a portion of which includes π-bonded systems, such as cycloalkadienyl ligands and heterocyclic analogues. The Cp ligands are distinct from the leaving groups bound to the catalyst compound in that they are not highly susceptible to substitution or abstraction reactions. The ligands represented by $Cp^A$ and $Cp^B$ in formula (I) may be the same or different cyclopentadienyl ligands or ligands isolobal to cyclopentadienyl, either or both of which may contain heteroatoms and either or both of which may be substituted by at least one R group. Non-limiting examples of substituent R groups include groups selected from hydrogen radicals, alkyls, alkenyls, alkynyls, cycloalkyls, aryls, acyls, aroyls, alkoxys, aryloxys, alkylthiols, dialkylamines, alkylamidos, alkoxycarbonyls, aryloxycarbonyls, carbomoyls, alkyl- and dialkyl-carbamoyls, acyloxys, acylaminos, aroylaminos, and combinations thereof. In one embodiment, $Cp^A$ and $Cp^B$ are independently selected from the group consisting of cyclopentadienyl, indenyl, tetrahydroindenyl, fluorenyl, and substituted derivatives of each. (As used herein, the term "substituted" means that the group following that term possesses at least one moiety in place of one or more hydrogens in any position, which moieties are selected from such groups as halogen radicals (e.g., Cl, F, Br), hydroxyl groups, carbonyl groups, carboxyl groups, amine groups, phosphine groups, alkoxy groups, phenyl groups, naphthyl groups, $C_1$ to $C_{10}$ alkyl groups, $C_2$ to $C_{10}$ alkenyl groups, and combinations thereof. Examples of substituted alkyls and aryls include, but are not limited to, acyl radicals, alkylamino radicals, alkoxy radicals, aryloxy radicals, alkylthio radicals, dialkylamino radicals, alkoxycarbonyl radicals, aryloxycarbonyl radicals, carbomoyl radicals, alkyl- and dialkyl-carbamoyl radicals, acyloxy radicals, acylamino radicals, arylamino radicals, and combinations thereof.)

In one embodiment, each leaving group X in the formula (I) above may be independently selected from the group consisting of halogen ions, hydrides, $C_{1-12}$ alkyls, $C_{2-12}$ alkenyls, $C_{6-12}$ aryls, $C_{7-20}$ alkylaryls, $C_{1-12}$ alkoxys, $C_{6-16}$ aryloxys, $C_{7-18}$ alkylaryloxys, $C_{1-12}$ fluoroalkyls, $C_{6-12}$ fluoroaryls, and $C_{1-12}$ heteroatom-containing hydrocarbons, and substituted derivatives thereof. As used herein, the phrase "leaving group" refers to one or more chemical moieties bound to the metal center of the catalyst component, which can be abstracted from the catalyst component by an activator, thus producing a species active towards olefin polymerization or oligomerization. The activator is described further below.

The structure of the metallocene catalyst component may take on many forms, such as those disclosed in, for example, U.S. Pat. Nos. 5,026,798, 5,703,187, and 5,747,406, including a dimer or oligomeric structure, such as disclosed in, for example, U.S. Pat. Nos. 5,026,798 and 6,069,213. Others include those catalysts describe in published U.S. Pat. App. Nos. US2005/0124487A1, US2005/0164875A1, and US2005/0148744. Each of the aforementioned references is hereby incorporated by reference. In other embodiments, the metallocene may be formed with a Hafnium metal atom, such as is described in U.S. Pat. No. 6,242,545, which is hereby incorporated by reference.

In certain embodiments, the metallocene catalysts components described above may include their structural or optical or enantiomeric isomers (racemic mixture), and, in one embodiment, may be a pure enantiomer. As used herein, a single, bridged, asymmetrically substituted metallocene catalyst component having a racemic and/or meso isomer does not, itself, constitute at least two different bridged, metallocene catalyst components.

In one embodiment, the metallocene catalyst contains hafnium as the metal atom. In other embodiments, at least one of the ligands (pi-bonded moieties) contains a cyclopentadienyl group. In other embodiments, the metallocene contains a chloride leaving group. In yet other embodiments, the metallocene contains a fluoride leaving group. In yet other embodiments, the metallocene contains a methyl leaving group.

In some embodiments, the metallocene catalyst may be a bis(n-propylcyclopentadienyl)hafnium $X_n$, bis(n-butylcyclopentadienyl)hafnium $X_n$, bis(n-pentylcyclopentadienyl) hafnium $X_n$, (n-propyl cyclopentadienyl)(n-butylcyclopentadienyl)hafnium $X_n$, bis[(2-trimethylsilylethyl) cyclopentadienyl]hafnium $X_n$, bis(trimethylsilyl cyclopentadienyl)hafnium $X_n$, dimethylsilylbis(n-propylcyclopentadienyl)hafnium $X_n$, dimethylsilylbis(n-butylcyclopentadienyl)hafnium bis(1-n-propyl-2-methylcyclopentadienyl)hafnium $X_n$, (n-propylcyclopentadienyl)(1-n-propyl-3-n-butylcyclopentadienyl)hafnium $X_n$, or combinations thereof, where $X_n$ is as described above.

In other embodiments, the metallocene catalyst may be a bis(n-propylcyclopentadienyl)hafnium dichloride, a bis(n-propylcyclopentadienyl)hafnium difluoride, or a dimethyl bis (n-propylcyclopentadienyl)hafnium.

Activator and Activation Methods for the Metallocene Catalyst Compounds

The term "activator" is defined to be any compound or component which can activate a transition metal metallocene-type catalyst compound as described above, for example, a Lewis acid or a non-coordinating ionic activator or ionizing activator or any other compound that can convert a neutral metallocene catalyst component to a metallocene cation. It is within the scope of this invention to use alumoxane or modified alumoxane as an activator, and/or to also use ionizing activators, neutral or ionic, such as tri(n-butyl) ammonium tetrakis(pentafluorophenyl) boron or a trisperfluorophenyl boron metalloid precursor which ionize the neutral metallocene compound. A preferred activator used with the catalyst compositions of the present invention is methylaluminoxane ("MAO"). The MAO activator may be associated with or bound to a support, either in association with the catalyst component (e.g., metallocene) or separate from the catalyst component, such as described by Gregory G. Hlatky, Heterogeneous Single-Site Catalysts for Olefin Polymerization, 100 (4) CHEMICAL REVIEWS 1347-1374 (2000).

There are a variety of methods for preparing alumoxane and modified alumoxanes, non-limiting examples of which are described in U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031, 5,391,793, 5,391,529, 5,693,838 and European publications EP-A-0 561 476, EP-B1-0 279 586 and EP-A-0 594-218, and PCT publication WO 94/10180, all of which are herein fully incorporated by reference.

Ionizing compounds may contain an active proton, or some other cation associated with but not coordinated or only loosely coordinated to the remaining ion of the ionizing compound. Such compounds and the like are described in European publications EP-A-0 570 982, EP-A-0 520 732, EP-A-0 495 375, EP-A-0 426 637, EP-A-500 944, EP-A-0 277 003 and EP-A-0 277 004, and U.S. Pat. Nos. 5,153,157, 5,198,401, 5,066,741, 5,206,197, 5,241,025, 5,387,568, 5,384,299 and 5,502,124, all of which are herein fully incorporated by reference. Combinations of activators are also contemplated by the invention, for example, alumoxanes and ionizing activators in combinations, see for example, PCT publications WO 94/07928 and WO 95/14044 and U.S. Pat. Nos. 5,153,157 and 5,453,410, all of which are herein fully incorporated by reference.

Method for Supporting

A support may also be present as part of the catalyst system of the present invention. Supports, methods of supporting, modifying, and activating supports for single-site catalyst such as metallocenes are discussed in, for example, 1 METALLOCENE-BASED POLYOLEFINS 173-218 (J. Scheirs & W. Kaminsky eds., John Wiley & Sons, Ltd. 2000). The terms "support" or "carrier," as used herein, are used interchangeably and refer to any support material, including inorganic or organic support materials. In one embodiment, the support material may be a porous support material. Non-limiting examples of support materials include inorganic oxides and inorganic chlorides, and in particular such materials as talc, clay, silica, alumina, magnesia, zirconia, iron oxides, boria, calcium oxide, zinc oxide, barium oxide, thoria, aluminum phosphate gel, and polymers such as polyvinylchloride and substituted polystyrene, functionalized or crosslinked organic supports such as polystyrene divinyl benzene polyolefins or polymeric compounds, and mixtures thereof, and graphite, in any of its various forms.

Desirable carriers are inorganic oxides that include Group 2, 3, 4, 5, 13 and 14 oxides and chlorides. Support materials include silica, alumina, silica-alumina, magnesium chloride, graphite, and mixtures thereof in one embodiment. Other useful supports include magnesia, titania, zirconia, montmorillonite (as described in EP0511665B1), phyllosilicate, and the like. In other embodiments, combinations of the support materials may be used, including, but not limited to, combinations such as silica-chromium, silica-alumina, silica-titania, and the like. Additional support materials may include those porous acrylic polymers described in EP0767184B1.

The catalyst system of the invention can be made and used in a variety of different ways. In one embodiment, the catalyst is unsupported, preferably in liquid form such as described in U.S. Pat. Nos. 5,317,036 and 5,693,727 and European publication EP-A-0593083, all of which are herein incorporated by reference. In the preferred embodiment, the catalyst system of the invention is supported. Examples of supporting the catalyst system used in the invention are described in U.S. Pat. Nos. 4,701,432, 4,808,561, 4,912,075, 4,925,821, 4,937,217, 5,008,228, 5,238,892, 5,240,894, 5,332,706, 5,346,925, 5,422,325, 5,466,649, 5,466,766, 5,468,702, 5,529,965, 5,554,704, 5,629,253, 5,639,835, 5,625,015, 5,643,847, 5,665,665, 5,468,702, 6,090,740 and PCT publications WO 95/32995, WO 95/14044, WO 96/06187, and WO 97/02297 all of which are herein fully incorporated by reference.

In another embodiment, the catalyst system of the invention contains a polymer bound ligand as described in U.S. Pat. No. 5,473,202, which is herein fully incorporated by reference. In one embodiment the catalyst system of the invention is spray dried as described in U.S. Pat. No. 5,648,310, which is fully incorporated herein by reference. In an embodiment the support of the invention is functionalized as described in European publication EP-A-0802203 or at least one substituent or leaving group is selected as described in U.S. Pat. No. 5,688,880, both of which are herein fully incorporated by reference.

In another embodiment of the invention, the supported catalyst system of the invention includes an antistatic agent or surface modifier, for example, those described in U.S. Pat. No. 5,283,278 and PCT publication WO 96/11960, which are herein fully incorporated by reference.

A preferred method for producing the catalyst of the invention can be found in WO 96/00245 and WO 96/00243, all of which are herein fully incorporated by reference.

Polymerization Process

The polymerization process of the present invention may be carried out using any suitable process, such as, for example, solution, slurry, high pressure, and gas phase. A particularly desirable method for producing polyolefin polymers according to the present invention is a gas phase polymerization process preferably utilizing a fluidized bed reactor. This type reactor, and means for operating the reactor, are described in, for example, U.S. Pat. Nos. 3,709,853; 4,003,712; 4,011,382; 4,302,566; 4,543,399; 4,882,400; 5,352,749; 5,541,270; EP-A-0 802 202 and Belgian Patent No. 839,380. These patents disclose gas phase polymerization processes wherein the polymerization medium is either mechanically agitated or fluidized by the continuous flow of the gaseous monomer and diluent.

Other gas phase processes contemplated by the process of the invention include series or multistage polymerization processes. Also gas phase processes contemplated by the invention include those described in U.S. Pat. Nos. 5,627,242, 5,665,818 and 5,677,375, and European publications EP-A-0 794 200 EP-B1-0 649 992, EP-A-0 802 202 and EP-B-634 421 all of which are herein fully incorporated by reference.

In general, the polymerization process may be a continuous gas phase process, such as a fluid bed process. A fluid bed reactor for use in the process of the present invention typically has a reaction zone and a so-called velocity reduction zone. The reaction zone includes a bed of growing polymer particles, formed polymer particles and a minor amount of catalyst particles fluidized by the continuous flow of the gaseous monomer and diluent to remove heat of polymerization through the reaction zone. The gas leaving the reaction zone is passed to the velocity reduction zone where entrained particles are allowed to settle back to the particle bed. Finer entrained particles and dust may be removed in a cyclone and/or fine filter. The gas is passed through a heat exchanger wherein the heat of polymerization is removed, compressed in a compressor and then returned to the reaction zone. Optionally, some of the recirculated gases may be cooled and compressed to form liquids that increase the heat removal capacity of the circulating gas stream when readmitted to the reaction zone. A suitable rate of gas flow may be readily determined by simple experiment. Makeup of gaseous monomer to the circulating gas stream is at a rate equal to the rate at which particulate polymer product and monomer associated therewith is withdrawn from the reactor, and the composition of the gas passing through the reactor is adjusted to maintain an essentially steady state gaseous composition within the reaction zone.

The process of the present invention is suitable for the production of homopolymers of olefins, including ethylene, and/or copolymers, terpolymers, and the like, of olefins, including polymers comprising ethylene and at least one or more other olefins. The olefins may be alpha-olefins. The olefins, for example, may contain from 2 to 16 carbon atoms in one embodiment; ethylene and a comonomer comprising from 3 to 12 carbon atoms in another embodiment; ethylene and a comonomer comprising from 4 to 10 carbon atoms in another embodiment; and ethylene and a comonomer comprising from 4 to 8 carbon atoms in another embodiment.

Other monomers useful in the process described herein include ethylenically unsaturated monomers, diolefins having 4 to 18 carbon atoms, conjugated or non-conjugated dienes, polyenes, vinyl monomers and cyclic olefins. Non-limiting monomers useful in the invention may include norbornene, norbornadiene, isobutylene, isoprene, vinylbenzocyclobutane, styrenes, alkyl substituted styrene, ethylidene norbornene, dicyclopentadiene and cyclopentene. In another embodiment of the process described herein, ethylene or propylene may be polymerized with at least two different comonomers, optionally one of which may be a diene, to form a terpolymer.

In one embodiment, the content of the alpha-olefin incorporated into the copolymer may be no greater than 30 mol % in total; from 3 to 20 mol % in other embodiments. The term "polyethylene" when used herein is used generically to refer to any or all of the polymers comprising ethylene described above.

Hydrogen gas is often used in olefin polymerization to control the final properties of the polyolefin. Using the catalyst system of the present invention, it is known that increasing the concentration (partial pressure) of hydrogen may increase the melt flow index (MFI) and/or melt index (MI) of the polyolefin generated. The MFI or MI can thus be influenced by the hydrogen concentration. The amount of hydrogen in the polymerization can be expressed as a mole ratio relative to the total polymerizable monomer, for example, ethylene, or a blend of ethylene and hexene or propylene. The amount of hydrogen used in the polymerization processes of the present invention is an amount necessary to achieve the desired MFI or MI of the final polyolefin resin.

Further, in certain embodiments, the polymerization process may include two or more reactors. Such commercial polymerization systems are described in, for example, 2 METALLOCENE-BASED POLYOLEFINS 366-378 (John Scheirs & W. Kaminsky, eds. John Wiley & Sons, Ltd. 2000); U.S. Pat. Nos. 5,665,818, 5,677,375, and EP-A-0 794 200.

In one embodiment, the one or more reactors in a gas phase or fluidized bed polymerization process may have a pressure ranging from about 0.7 to about 70 bar (about 10 to 1000 psia); and in another embodiment, a pressure ranging from about 14 to about 42 bar (about 200 to about 600 psia). In one embodiment, the one or more reactors may have a temperature ranging from about 10° C. to about 150° C.; and in another embodiment from about 40° C. to about 125° C. In one embodiment, the reactor temperature may be operated at the highest feasible temperature taking into account the sintering temperature of the polymer within the reactor. In one embodiment, the superficial gas velocity in the one or more reactors may range from about 0.2 to 1.1 meters/second (0.7 to 3.5 feet/second); and from about 0.3 to 0.8 meters/second (1.0 to 2.7 feet/second) in another embodiment.

In another embodiment of the invention, the polymerization process is a continuous gas phase process that includes the steps of: (a) introducing ethylene and at least one other alpha olefin monomer(s) into the reactor; (b) introducing the supported catalyst system; (c) withdrawing a recycle stream from the reactor; (d) cooling the recycle stream; (e) introducing into the reactor additional monomer(s) to replace the monomer(s) polymerized; (f) reintroducing the recycle stream or a portion thereof into the reactor; and (g) withdrawing a polymer product from the reactor.

In embodiments of the invention, one or more olefins, $C_2$ to $C_{30}$ olefins or alpha-olefins, including ethylene or propylene or combinations thereof, may be prepolymerized in the presence of the metallocene catalyst systems described above prior to the main polymerization. The prepolymerization may be carried out batch-wise or continuously in gas, solution or slurry phase, including at elevated pressures. The prepolymerization can take place with any olefin monomer or combination and/or in the presence of any molecular weight controlling agent such as hydrogen. For examples of prepolymerization procedures, see U.S. Pat. Nos. 4,748,221, 4,789,359, 4,923,833, 4,921,825, 5,283,278 and 5,705,578 and European publication EP-B-0279 863 and PCT Publication WO 97/44371 all of which are herein fully incorporated by reference.

The present invention is not limited to any specific type of fluidized or gas phase polymerization reaction and can be carried out in a single reactor or multiple reactors such as two or more reactors in series. In embodiments, the present invention may be carried out in fluidized bed polymerizations (that may be mechanically stirred and/or gas fluidized), or with those utilizing a gas phase, similar to that as described above. In addition to well-known conventional gas phase polymerization processes, it is within the scope of the present invention that "condensing mode", including the "induced condensing mode" and "liquid monomer" operation of a gas phase polymerization may be used.

Embodiments of the present invention may employ a condensing mode polymerization, such as those disclosed in U.S. Pat. Nos. 4,543,399; 4,588,790; 4,994,534; 5,352,749; 5,462,999; and 6,489,408, each of which is hereby incorporated by reference. Condensing mode processes may be used to achieve higher cooling capacities and, hence, higher reactor productivity. In addition to condensable fluids of the polymerization process itself, other condensable fluids inert to the polymerization may be introduced to induce a condensing mode operation, such as by the processes described in U.S. Pat. No. 5,436,304, which is hereby incorporated by reference.

Other embodiments of the preset invention may also use a liquid monomer polymerization mode such as those disclosed in U.S. Pat. No. 5,453,471; U.S. Ser. No. 08/510,375; PCT 95/09826 (US) and PCT 95/09827 (US). When operating in the liquid monomer mode, liquid can be present throughout the entire polymer bed provided that the liquid monomer present in the bed is adsorbed on or in solid particulate matter present in the bed, such as polymer being produced or inert particulate material (e.g., carbon black, silica, clay, talc, and mixtures thereof), so long as there is no substantial amount of free liquid monomer present. Operating in a liquid monomer mode may also make it possible to produce polymers in a gas phase reactor using monomers having condensation temperatures much higher than the temperatures at which conventional polyolefins are produced.

In one embodiment, a useful polymerization technique may be particle form polymerization or a slurry process where the temperature is kept below the temperature at which the polymer goes into solution. Other slurry processes include those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. Nos. 4,613,484 and 2 METALLOCENE-BASED POLYOLEFINS 322-332 (2000).

In one embodiment, a slurry polymerization process generally uses pressures in the range of from 1 to 50 bar and even greater, and temperatures in the range of 0° C. to 120° C. In a slurry polymerization, a suspension of solid, particulate polymer is formed in a liquid polymerization diluent medium to which ethylene and comonomers and often hydrogen along with catalyst are added. The suspension, including diluent, is intermittently or continuously removed from the reactor where the volatile components are separated from the polymer and recycled, optionally after a distillation, to the reactor. The liquid diluent employed in the polymerization medium is typically an alkane having from 3 to 7 carbon atoms; in one embodiment, the alkane may be a branched alkane. The medium employed should be liquid under the conditions of polymerization and relatively inert. When a propane medium is used, the process must be operated above the reaction diluent critical temperature and pressure. In one embodiment, a hexane or an isobutane medium is employed.

In one embodiment of the process of the invention, the slurry or gas phase process may be operated in the presence of a metallocene-type catalyst system and in the absence of, or essentially free of, any scavengers, such as triethylaluminum, trimethylaluminum, tri-isobutylaluminum and tri-n-hexylaluminum and diethyl aluminum chloride, dibutyl zinc, and the like. By "essentially free" it is meant that these compounds are not deliberately added to the reactor or any reactor components, and if present, are present in the reactor at less than 1 ppm.

As noted above, the polymerization process of the present invention may be carried out by using a solution process. Non-limiting examples of solution processes are described in, for example, U.S. Pat. Nos. 4,271,060, 5,001,205, 5,236,998, and 5,589,555.

In another embodiment, one or all of the catalysts are combined with up to 15 weight percent of a metal-fatty acid compound, such as, for example, an aluminum stearate, based upon the weight of the catalyst system (or its components), such as disclosed in, for example, U.S. Pat. Nos. 6,300,436 and 5,283,278. Other suitable metals include other Group 2 and Group 5-13 metals. In another embodiment, a solution of the metal-fatty acid compound is fed into the reactor. In another embodiment, the metal-fatty acid compound is mixed with the catalyst and fed into the reactor separately. These agents may be mixed with the catalyst or may be fed into the reactor in a solution or slurry with or without the catalyst system or its components.

In some embodiments, for a fluidized bed gas-phase reactor, the reactor temperature of the fluidized bed process may be the highest temperature that is feasible taking into account the sticking temperature of the polyolefin product within the reactor and any fouling that may occur in the reactor or recycle line(s).

For example, for the production of a typical metallocene-catalyzed resin in a fluidized bed gas-phase reactor, the reactor bed temperature is normally operated considerably below the melting temperature (DSC, $2^{nd}$ melt) of the produced polymer. For a typical metallocene LLDPE film resin of 0.912 g/cc density and a melt index of 1 dg/min, the melting temperature of the polymer is in the range of 116° C. to 117° C. (as measured by DSC $2^{nd}$ melt). For these grades the bed temperature would normally be set at 80° C. Stickiness in the polymer would be induced if the reactor bed temperature were increased.

In some embodiments, for the production of the inventive metallocene catalyzed resins described herein in a fluidized bed gas-phase reactor embodiment, the reactor bed temperature may be 85° C. or higher. In other embodiments, the reactor bed temperature may be 90° C. or higher.

Polymer

The polyolefins of the present invention may be blended with other polymers and/or additives to form compositions that can then be used in articles of manufacture. Those additives include antioxidants, nucleating agents, acid scavengers, plasticizers, stabilizers, anticorrosion agents, blowing agents, ultraviolet light absorbers, quenchers, antistatic agents, slip agents, pigments, dyes and fillers, and cure agents such as peroxides. These and other common additives in the polyolefin industry may be present in polyolefin compositions from 0.01 to 50 weight percent in one embodiment, and from 0.1 to 20 weight percent in another embodiment, and from 1 to 5 weight percent in yet another embodiment, wherein a desirable range may include any combination of any upper weight percent limit with any lower weight percent limit. Antioxidants and stabilizers such as organic phosphites, hindered amines, and phenolic antioxidants may be present in the polyolefin compositions of the invention from 0.001 to 5 weight percent in one embodiment, from 0.01 to 0.8 weight percent in another embodiment, and from 0.02 to 0.5 weight percent in yet another embodiment.

Fillers may be present from 0.1 to 50 weight percent in one embodiment, and from 0.1 to 25 weight percent of the composition in another embodiment, and from 0.2 to 10 weight percent in yet another embodiment. Desirable fillers include, but are not limited to, titanium dioxide, silicon carbide, silica (and other oxides of silica, precipitated or not), antimony oxide, lead carbonate, zinc white, lithopone, zircon, corundum, spinel, apatite, Barytes powder, barium sulfate, magnesiter, carbon black, dolomite, calcium carbonate, talc and hydrotalcite compounds of the ions Mg, Ca, or Zn with Al, Cr or Fe and $CO_3$ and/or $HPO_4$, hydrated or not; quartz powder, hydrochloric magnesium carbonate, glass fibers, clays, alumina, and other metal oxides and carbonates, metal hydroxides, chrome, phosphorous and brominated flame retardants, antimony trioxide, silica, silicone, and blends thereof. These fillers may particularly include any other fillers and porous fillers and supports known in the art.

Fatty acid salts may also be present in the polyolefin compositions of the present invention. Such salts may be present from 0.001 to 2 weight percent of the composition in one embodiment, and from 0.01 to 1 weight percent in another embodiment. Examples of fatty acid metal salts include lauric acid, stearic acid, succinic acid, stearyl lactic acid, lactic acid, phthalic acid, benzoic acid, hydroxystearic acid, ricinoleic acid, naphthenic acid, oleic acid, palmitic acid, and erucic acid, suitable metals including Li, Na, Mg, Ca, Sr, Ba, Zn, Cd, Al, Sn, Pb and so forth. Desirable fatty acid salts are selected from magnesium stearate, calcium stearate, sodium stearate, zinc stearate, calcium oleate, zinc oleate, and magnesium oleate.

With respect to the physical process of producing the blend of polyolefin and one or more additives, sufficient mixing should take place to assure that a uniform blend will be produced prior to conversion into a finished product. The polyolefin suitable for use in the present invention can be in any physical form when used to blend with the one or more additives. In one embodiment, reactor granules (defined as the granules of polymer that are isolated from the polymerization reactor) are used to blend with the additives. The reactor granules have an average diameter of from 10 microns to 5 mm; from 50 microns to 10 mm in another embodiment. Alternately, the polyolefin is in the form of pellets, such as, for example, pellets having an average diameter of from 1 mm to 6 mm that are formed from melt extrusion of the reactor granules.

One method of blending the additives with the polyolefin is to contact the components in a tumbler or other physical blending means, the polyolefin being in the form of reactor granules. This can then be followed, if desired, by melt blending in an extruder. Another method of blending the components is to melt blend the polyolefin pellets with the additives directly in an extruder, BRABENDER® or any other melt blending means.

The resultant polyolefin and polyolefin compositions of the present invention may be further processed by any suitable means such as by calendering, casting, coating, compounding, extrusion, foaming; all forms of molding including compression molding, injection molding, blow molding, rotational molding (rotomolding), and transfer molding; film blowing or casting and all methods of film formation to achieve, for example, uniaxial or biaxial orientation; thermoforming, as well as by lamination, pultrusion, protrusion, draw reduction, spinbonding, melt spinning, melt blowing, and other forms of fiber and nonwoven fabric formation, and combinations thereof. These and other forms of suitable processing techniques are described in, for example, PLASTICS PROCESSING (Radian Corporation, Noyes Data Corp. 1986).

In the case of injection molding of various articles, simple solid state blends of the pellets serve equally as well as pelletized melt state blends of raw polymer granules, of granules with pellets, or of pellets of the two components, since the forming process includes a remelting and mixing of the raw material. In the process of compression molding of medical devices, however, little mixing of the melt components occurs, and a pelletized melt blend would be preferred over simple solid state blends of the constituent pellets and/or granules. Those skilled in the art will be able to determine the appropriate procedure for blending of the polymers to balance the need for intimate mixing of the component ingredients with the desire for process economy.

The polymers produced may further contain additives such as slip, antiblock, antioxidants, pigments, fillers, antifog, UV stabilizers, antistats, polymer processing aids, neutralizers, lubricants, surfactants, pigments, dyes and nucleating agents. Preferred additives include silicon dioxide, synthetic silica, titanium dioxide, polydimethylsiloxane, calcium carbonate, metal stearates, calcium stearate, zinc stearate, talc, $BaSO_4$, diatomaceous earth, wax, carbon black, flame retarding additives, low molecular weight resins, hydrocarbon resins, glass beads and the like. The additives may be present in the typically effective amounts well known in the art, such as 0.001 weight % to 10 weight %.

In one embodiment, the polymers disclosed herein may have a melt index (MI) or ($I_2$) as measured by ASTM-D-1238-E (190° C., 2.16 kg weight) in the range from 0.01 dg/min to 1000 dg/min. In other embodiments, the polymer may have a MI from about 0.01 dg/min to about 100 dg/min; from about 0.1 dg/min to about 80 dg/min in other embodiments; and from about 0.5 dg/min to about 70 dg/min in yet other embodiments.

In one embodiment, the polymers disclosed herein may have a melt index ratio ($I_5/I_2$) ($I_5$ is measured by ASTM-D-1238-G, at 190° C., 5 kg weight) of from 5 to 300. In other embodiments, the polymer may have a melt index ratio from about 10 to less than 250; from 15 to 200 in another embodiment; and from 20 to 180 in yet another embodiment. In other embodiments the polymer may have a melt index ratio from 15 to 30; from 10 to 40 in another embodiment; and from 5 to 50 in yet another embodiment.

In one embodiment, the polymers disclosed herein may have a melt flow ratio (MFR) ($I_{21}/I_2$, where $I_{21}$ is measured by ASTM-D-1238-F, at 190° C., 21.6 kg weight) of from 5 to 300; from about 10 to less than 250 in other embodiments; from 15 to 200 in yet other embodiments; and from 20 to 180 in yet another embodiment. In other embodiments the polymers may have a MFR from 15 to 30; from 10 to 40 in another embodiment; and from 5 to 50 in yet another embodiment.

The polymers of the present invention have a bulk density measured in accordance with ASTM-D-1895 (Method B) that, in one embodiment, is greater than at least 0.30 grams per cubic centimeter. In another embodiment, the bulk density of the polymers is in the range of 0.30 to 0.50 grams per cubic centimeter.

The polyolefins then can be made into films, molded articles, sheets, wire and cable coating and the like. The films may be formed by any of the conventional technique known in the art including extrusion, co-extrusion, lamination, blowing and casting. The film may be obtained by the flat film or tubular process which may be followed by orientation in a uniaxial direction or in two mutually perpendicular directions in the plane of the film to the same or different extents. Orientation may be to the same extent in both directions or may be to different extents. Particularly preferred methods to form the polymers into films include extrusion or coextrusion on a blown or cast film line.

Common rheological properties, processing methods and end use applications of metallocene based polyolefins are discussed in, for example, 2 METALLOCENE-BASED POLYOLEFINS 400-554 (John Scheirs & W. Kaminsky, eds. John Wiley & Sons, Ltd. 2000). The polyolefin compositions of the present invention are suitable for such articles as films, fibers and nonwoven fabrics, extruded articles and molded. Examples of films include blown or cast films formed by coextrusion or by lamination useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications, agricultural films and sheets. Examples of fibers include melt spinning, solution spinning and melt blown fiber operations for use in woven or non-woven form to make filters, diaper fabrics, hygiene products, medical garments, geotextiles, etc. Examples of extruded articles include tubing, medical tubing, wire and cable coatings, pipe, geomembranes, and pond liners. Examples of molded articles include single and multi-layered constructions in the form of bottles, tanks, large hollow articles, rigid food containers and toys, etc.

Other desirable articles that can be made from and/or incorporate the polyolefins of the present invention include automotive components, sporting equipment, outdoor furniture (e.g., garden furniture) and playground equipment, boat and water craft components, and other such articles. More particularly, automotive components include such as bumpers, grills, trim parts, dashboards and instrument panels, exterior door and hood components, spoiler, wind screen, hub caps, mirror housing, body panel, protective side molding, and other interior and external components associated with automobiles, trucks, boats, and other vehicles.

Further useful articles and goods may be formed economically or incorporate the polyolefins produced by the practice of our invention including: crates, containers, packaging material, labware, office floor mats, instrumentation sample holders and sample windows; liquid storage containers for medical uses such as bags, pouches, and bottles for storage and IV infusion of blood or solutions; wrapping or containing food preserved by irradiation, other medical devices including infusion kits, catheters, and respiratory therapy, as well as packaging materials for medical devices and food which may be irradiated by gamma or ultraviolet radiation including trays, as well as stored liquid, particularly water, milk, or juice, containers including unit servings and bulk storage containers.

Polyethylenes useful for the compositions described herein may be prepared by a variety of methods. The polymerization can be conducted as solution phase processes, gas phase processes, and the like. Ethylene homopolymers and ethylene alpha-olefin copolymers useful herein may include linear polyethylenes including linear low density polyethylene (LLDPE, having a density in the range 0.918 to 0.927 g/cc, as determined in accordance with ASTM D 792), medium density polyethylene (MDPE, density from 0.927 to 0.940 g/cc), high density polyethylene (HDPE, density greater than 0.940), very low density polyethylene (VLDPE, density ranging from 0.900 to 0.918) and ultra low density polyethylene (ULDPE, density from 0.860 to 0.899 g/cc).

The polymers described herein typically have a weight average molecular weight to number average molecular weight ($M_w/M_n$) of greater than 1.5 to about 5, particularly greater than 2 to about 4.0, more preferably greater than about 2.2 to less than 3.5.

Composition Distribution

The composition distribution of an ethylene alpha-olefin copolymer refers to the distribution of comonomer (short chain branches) among the molecules that comprise the polyethylene polymer. Ziegler-Natta catalysts and chromium based catalysts produce resins with broad composition distributions (BCD). These Ziegler-Natta and chromium based BCD resins are further characterized in that the comonomer content decreases with the molecular weight of the main polymer chains. Certain metallocene catalysts are capable of producing resins with narrow composition distributions (NCD), in which the comonomer content is about uniform among the polymer chains of different molecular weights. For example, U.S. Pat. No. 5,382,630 discloses linear ethylene interpolymer blends made from components that can have the same molecular weight but different comonomer contents, or the same comonomer contents but different molecular weights, or comonomer contents that increase with molecular weight (orthogonal composition distribution).

Certain advantages of a broad orthogonal composition distribution (BOCD) for improved physical properties low extractables content. (See, for example, by Kolb et al. at the METALLOCENE CONFERENCE 2004, May 13, 2004—Houston, Tex., USA; and Davey et al. at the SPE-Polyolefins 2002 International Conference, Feb. 25-27, 2002 in Houston, Tex.; and Farley et al. at the SPE International Polyolefins 2005 Conference Feb. 27-Mar. 2, 2005 in Houston, Tex.).

BOCD refers to a broad composition distribution in which the majority of the comonomer is incorporated in the high molecular weight polymer chains. The distribution of the short chain branches can be measured, for example, using temperature raising elution fractionation (TREF) in connection with a light scattering (LS) detector to determine the weight average molecular weight of the molecules eluted from the TREF column at a given temperature. The combination of TREF and LS (TREF-LS) yields information about the breadth of the composition distribution and whether the comonomer content increases, decreases, or is uniform across the chains of different molecular weights.

The TREF-LS data reported herein were measured using an analytical size TREF instrument (Polymerchar, Spain), with a column of the following dimension: inner diameter (ID) 7.8 mm and outer diameter (OD) 9.53 mm and a column length of 150 mm. The column was filled with steel beads. 0.5 mL of a 6.4% (w/v) polymer solution in orthodichlorobenzene (ODCB) containing 6 g BHT/4 L were charged onto a the column and cooled from 140° C. to 25° C. at a constant cooling rate of 1.0° C./min. Subsequently, ODCB was pumped through the column at a flow rate of 1.0 ml/min, and the column temperature was increased at a constant heating rate of 2° C./min to elute the polymer. The polymer concentration in the eluted liquid was detected by means of measuring the absorption at a wavenumber of 2857 cm$^{-1}$ using an infrared detector. The concentration of the ethylene-α-olefin copolymer in the eluted liquid was calculated from the absorption and plotted as a function of temperature. The molecular weight of the ethylene-α-olefin copolymer in the eluted liquid was measured by light scattering using a Minidawn Tristar light scattering detector (Wyatt, Calif., USA). The molecular weight was also plotted as a function of temperature.

In certain embodiments, the polymers as described herein may have a broad composition distribution characterized in that the $T_{75}-T_{25}$ value is greater than 15, preferably greater than 20 and most preferably greater than 25, wherein $T_{25}$ is the temperature at which 25% of the eluted polymer is obtained and $T_{75}$ is the temperature at which 75% of the eluted polymer is obtained in a TREF experiment as described herein. The polymer as described herein may further be characterized in that the composition distribution is orthogonal defined by a $M_{60}/M_{90}$ value of greater than 1, preferably greater than 2 and most preferably greater than 3, wherein $M_{60}$ is the molecular weight of the polymer fraction that elutes at 60° C. in a TREF-LS experiment and $M_{90}$ is the molecular weight of the polymer fraction that elutes at 90° C. in a TREF-LS experiment as described herein.

Hexane Extractables by FDA Method

FDA regulations for food packaging require the level of hexane extractables be below 5.3% for general use and below 2.5% for "boil in bag" application. While high melt index, medium to low density products made with Z—N catalysts typically fulfill the first requirement, often by shifting density and/or changing the comonomer type, their intrinsic properties impede the 2.5% threshold. The metallocenes described herein may be able to deliver products in a wide range of melt indicia and densities without any FDA constraints related to the levels of hexane extractables, including the more stringent "boil in bag" restriction. In some embodiments, the resins described herein may have a hexane extractable content of less than 2 percent according to the FDA method (see 21

C.F.R. §177.1520, as revised Apr. 1, 2005, for details on the FDA method and requirements for food contact, repeated and while cooking).

In class of embodiments described herein, the copolymer has a hexane extractable content of 2.5 percent or less when tested in accordance with the FDA method stated in 21 C.F.R. §177.1520.

In another class of embodiments described herein, the copolymer has a hexane extractable content of 2.0 percent or less when tested in accordance with the FDA method stated in 21 C.F.R. §177.1520.

In yet another class of embodiments described herein, the copolymer has a hexane extractable content of 1.5 percent or less when tested in accordance with the FDA method stated in 21 C.F.R. §177.1520.

In other embodiments, the hexane extractables content may be less than 1.75 percent; less than 1.5 percent in other embodiments; and less than 1.4 percent in yet other embodiments.

Melting Point ($2^{nd}$ Melt)

In some embodiments, the ethylene/alpha-olefin copolymers may have one or more melting points wherein the higher melting point ($T_{max\ second\ melt}$) as determined by Differential Scanning calorimetry (DSC) and the density of the copolymer satisfy the following relation:

$$T_{max\ second\ melt} > D*398-245,$$

wherein D is the density of the copolymer.

In other embodiments, the ethylene/alpha-olefin copolymers may have one or more melting points wherein the higher melting point ($T_{max\ second\ melt}$) as determined by Differential Scanning calorimetry (DSC) and the density of the copolymer satisfy the following relation:

$$T_{max\ second\ melt} > D*398-242,$$

wherein D is the density of the copolymer.

Melting Point ($1^{st}$ Melt)

In some embodiments, the ethylene/alpha-olefin copolymers may have one or more melting points wherein the higher melting point ($T_{max\ first\ melt}$) as determined by Differential Scanning calorimetry (DSC) and the density of the copolymer satisfy the following relation:

$$T_{max\ first\ melt} > D*398-245$$

wherein D is the density of the copolymer.

In some embodiments, the ethylene/alpha-olefin copolymers may have one or more melting points wherein the higher melting point ($T_{max\ first\ melt}$) as determined by Differential Scanning calorimetry (DSC) and the density of the copolymer satisfy the following relation:

$$T_{max\ first\ melt} > D*398-242$$

wherein D is the density of the copolymer.

For example, DSC measurements may be made on a Perkin Elmer System 7 Thermal Analysis System. The data reported are $T_{max}$ from first melting data ($T_{max\ first\ melt}$) and $T_{max}$ from second melting data ($T_{max\ second\ melt}$), respectively. To obtain the $T_{max\ first\ melt}$, a sample of reactor granules is heated at a programmed rate of 10° C./min to a temperature above its melting range. To obtain the $T_{max\ second\ melt}$, the sample is heated at a programmed rate of 10° C./min to a temperature above its melting range, cooled at a programmed rate of 10° C./min to a temperature below its crystallization range, and reheated at a programmed rate of 10° C./min, where the data reported is from the reheating (second melt).

Approximate values for the peak melting point temperature, $T_{max\ second\ melt}$, of several commercially available metallocene-catalyzed polyethylenes, for given combinations of density and melt flow, are shown in Table 1 below. The $T_{max\ second\ melt}$ of a commercially available polyethylene produced with a metallocene catalyst will vary depending upon the polymer's melt flow and density. For example, a commercially available metallocene-catalyzed metallocene polyethylene having a density of about 0.912 g/cc and a melt index ($I_2$) of about 1.0 dg/min will have a peak melting point temperature of approximately 116° C. A higher density polymer will generally have a higher melting point.

TABLE 1

Peak melting temperatures of commercially available bulky ligand metallocene-catalyzed polyethylene grades

| Density g/cc | Melt Index ($I_2$) dg/min | Peak Melting Point Temperature, $T_{max\ second\ melt}$ approximate, ° C. |
|---|---|---|
| 0.912 | 1.0 | 116-117 |
|  | 3.5 | 112-113 |
|  | 12.0 | 109-110 |
| 0.915 | 1.0 | 116-117 |
| 0.918 | 1.0 | 118-119 |
|  | 1.25 | 118-119 |
|  | 1.5 | 118-119 |
|  | 2.0 | 117-118 |
|  | 2.7 | 116-117 |
|  | 3.5 | 113-114 |
|  | 4.5 | 113-114 |
| 0.923 | 1.0 | 121-122 |
| 0.927 | 1.3 | 121-122 |

It has been found that the melting points of ethylene alpha-olefin copolymers described herein and produced using certain inventive metallocene catalysts described herein, are substantially higher than similar copolymer grades produced with various other metallocene catalysts, where the copolymer grades compared have substantially identical production targets, including melt flow and density. For example, in some embodiments, a metallocene-type polyethylene having a density of 0.927 or less may have a melting point of about 123° C. or greater; about 124° C. or greater in other embodiments; and about 125° C. or greater in yet other embodiments. In other embodiments, a metallocene-type polyethylene having a density of 0.918 g/cc or less may have a melting point of about 119° C. or greater; about 120° C. or greater in other embodiments; about 121° C. or greater in other embodiments; and about 122° C. or greater in yet other embodiments.

In certain embodiments, it has been found that polyethylene grades produced with metallocene catalysts described herein have a melting point approximately five degrees Celsius (5° C.) higher than comparable metallocene-produced grades, such as those which are commercially available or described in Table 1 above. For example, a polyethylene produced with a metallocene catalyst, having a melt index of approximately 1.0 dg/min and a density of approximately 0.915 g/cc will have a $T_{max\ second\ melt}$ of approximately 116° C., as shown above in Table 1, whereas a comparable polyethylene produced with embodiments of the metallocene catalysts described herein may have an unexpectedly high $T_{max\ second\ melt}$, about 121° C.

In other embodiments, it has been found that polyethylene grades produced with embodiments of the metallocene catalysts described herein have a melting point as measured by DSC 1st melt of the reactor granules that is about ten degrees Celsius (10° C.) higher than comparable metallocene-produced grades, such as those which are commercially available or described in Table 1 above.

In yet other embodiments, it has been found that polyethylene grades produced with embodiments of the metallocene catalysts described herein have an onset of the main melting peak as measured by DSC 1st melt of the reactor granules that is more than about ten degrees Celsius (10° C.) higher than comparable metallocene-produced grades, such as those which are commercially available or described in Table 1 above.

In certain embodiments, it has been found that the resin and resulting films produced from polyethylene grades produced with embodiments of the metallocene catalysts described herein, having a higher melting point (1st melt or 2nd melt) than comparable metallocene-catalyzed grades, have properties that are substantially identical to those of the metallocene-catalyzed grades.

In other embodiments, it has been found that films produced from the polyethylene grades produced with embodiments of the metallocene catalysts described herein, having a higher melting temperature ($1^{st}$ or $2^{nd}$ melt) than comparable metallocene-catalyzed grades, possess properties substantially improved compared to films produced from comparable metallocene-catalyzed grades. In some embodiments, films produced from the polyethylene grades described herein may have a MD tear strength of 46 kN/m (120 g/mil) or greater. In other embodiments, films produced may have a MD tear strength of 77 kN/m (200 g/mil) or greater; 96 kN/m (250 g/mil) or greater in other embodiments; 115 kN/m (300 g/mil) or greater in other embodiments; 134 kN/m (350 g/mil) or greater in other embodiments; 154 kN/m (400 g/mil) or greater in other embodiments; and 192 kN/m (500 g/mil) or greater in yet other embodiments.

In some embodiments, films produced from the polyethylene grades described herein may have a dart impact strength of 134 kN/m (350 g/mil) or greater. In other embodiments, films produced may have a dart impact strength of 154 kN/m (400 g/mil) or greater; 192 kN/m (500 g/mil) or greater in other embodiments; and 231 kN/m (600 g/mil) or greater in yet other embodiments.

In some embodiments, films produced from the polyethylene grades described herein may have a hot seal initiation temperature of 90° C. or less. In other embodiments, films produced may have a heat seal initiation temperature of 85° C. or less; 82° C. or less in other embodiments; and 80° C. or less in yet other embodiments.

In some embodiments, films produced from the polyethylene grades described herein may have a 1% secant modulus of 103 MPa (15000 psi) or greater. In other embodiments, films produced may have a 1% secant modulus of 137 MPa (20000 psi) or greater; 172 MPa (25000 psi) or greater in other embodiments; 200 MPa (29000 psi) or greater in yet other embodiments.

In some embodiments, films produced from the polyethylene grades described herein may have a hot tack force at 90° C. of 6 N/25 mm or greater; 8 N/25 mm or greater in other embodiments; and 10 N/25 mm or greater in yet other embodiments. In some embodiments, films produced from the polyethylene grades described herein may have a hot tack force at 85° C. of 6 N/25 mm or greater; 8 N/25 mm or greater in other embodiments; and 10 N/25 mm or greater in yet other embodiments. In some embodiments, films produced from the polyethylene grades described herein may have a hot tack force at 80° C. of 6 N/25 mm or greater; 8 N/25 mm or greater in other embodiments; and 10 N/25 mm or greater in yet other embodiments.

In some embodiments films produced from the polyethylene grades described herein may have a maximum hot tack force at 90° C. of 15 N/25 mm; 16 N/25 mm in other embodiments; and 17 N/25 mm in yet other embodiments. In some embodiments, films produced from the polyethylene grades described herein may have a maximum hot tack force at 85° C. of 15 N/25 mm; 16 N/25 mm in other embodiments; and 17 N/25 mm or greater in yet other embodiments. In some embodiments, films produced from the polyethylene grades described herein may have a maximum hot tack force at 80° C. of 15 N/25 mm; 16 N/25 mm in other embodiments; and 17 N/25 mm in yet other embodiments.

In other embodiments, the films produced may advantageously have two or more improved values for the above described properties. For example, in some embodiments, films produced from the polymers described herein may have a MD tear strength of 77 kN/m (200 g/mil) or greater, a dart impact strength of 192 kN/m (500 g/mil) or greater, and a heat seal initiation temperature of 85° C. or less, where the polymer further satisfies the following relationship between melting point and density: $T_{max\,first\,melt} > D*398-242$. The polymer may also have a hot tack force, maximum hot tack force, 1% secant modulus, or other properties as described above. In other embodiments, blends incorporating the polymers described herein may advantageously be used in films having two or more of the improved values for the above described properties.

These surprisingly high peak melting point temperatures may advantageously improve the processability and end properties of the resulting polymers. More specific embodiments of the catalyst systems and product analyses will be illustrated by the examples below.

EXAMPLES

Example 1

Higher DSC Melting Point ($2^{nd}$ Melt)

Two polyethylene grades produced with embodiments of the metallocene catalyst described herein were compared to a commercially available metallocene polyethylene of similar melt index and density, as described in Table 2. Sample 1 and Sample 2 were each prepared using [bis(n-propyl cyclopentadienyl)hafnium dimethyl]. Sample 1 was produced at a reactor temperature of 75° C.; Sample 2 at 80° C. Comparative Sample 1 (CS1) was prepared using bis(1-methyl-3-butyl cyclopentadienyl)zirconium dichloride at a reactor temperature of approximately 80° C.

TABLE 2

| Sample | Melt Index, $I_2$ Dg/min | Density g/cc | Reaction Temperature ° C. | $T_{max}$ DSC $2^{nd}$ melt ° C. |
|---|---|---|---|---|
| 1 | 1.16 | 0.9145 | 75 | 121 |
| 2 | 1.05 | 0.9137 | 80 | 121 |
| CS1 | 1.08 | 0.9145 | 80 | 116 |

DSC curves of three polyethylene samples are compared in FIG. 1. The peak melting temperature for the CS1 was approximately 116° C., whereas the peak melting temperature for the Sample 1 and Sample 2 were each approximately 121° C. Sample 1 and Comparative Sample 1 had identical densities and similar melt indexes, where Sample 1 was produced at a lower reaction temperature. Sample 2 and Comparative Sample 1 were produced under similar reactor conditions, with Sample 2 having a lower density and a higher melting point. The higher melting point at higher melt indices and lower reactor temperature can thus be attributed to the catalyst and the resulting compositional distribution.

Example 2

Higher DSC Melting Point (1$^{st}$ Melt) and Onset of Melting (1$^{st}$ Melt)

Four polyethylene grades produced with embodiments of the metallocene catalyst described herein were compared to two commercially available metallocene-produced polyethylenes of similar melt index and density, as described in Table 3. Samples 3 through 6 were each prepared using [bis(n-propyl cyclopentadienyl)hafnium dimethyl]. Sample 5 was prepared in condensed mode with isopentane present in the reactor. Sample 6 was prepared without condensing agent present in the reactor. Comparative Samples 2 and 3 (CS2 and CS3, EXCEED™ 1012 and EXCEED™ 1018, respectively are commercial grades available from ExxonMobil Chemicals).

TABLE 3

| Sample | Reactor Temp ° C. | Melt Index, I$_2$ Dg/min | Density g/cc | T$_{max\ first\ melt}$ ° C. | Melting onset from DSC 1st melt ° C. |
|---|---|---|---|---|---|
| 3 | 75° C. | 1.0 | 0.9133 | 121.7 | 112.5 |
| 4 | 80° C. | 0.97 | 0.9129 | 121.19 | 108.4 |
| 5 | 80° C. | 0.6 | 0.919 | 124.08 | 111.7 |
| 6 | 80° C. | 0.87 | 0.921 | 123.74 | 111.8 |
| CS2 | 80° C. | 1.08 | 0.912 | 100.19 | 92.2 |
| CS3 | 80° C. | 1.0 | 0.918 | 109.71 | 99.3 |

Figure 2:
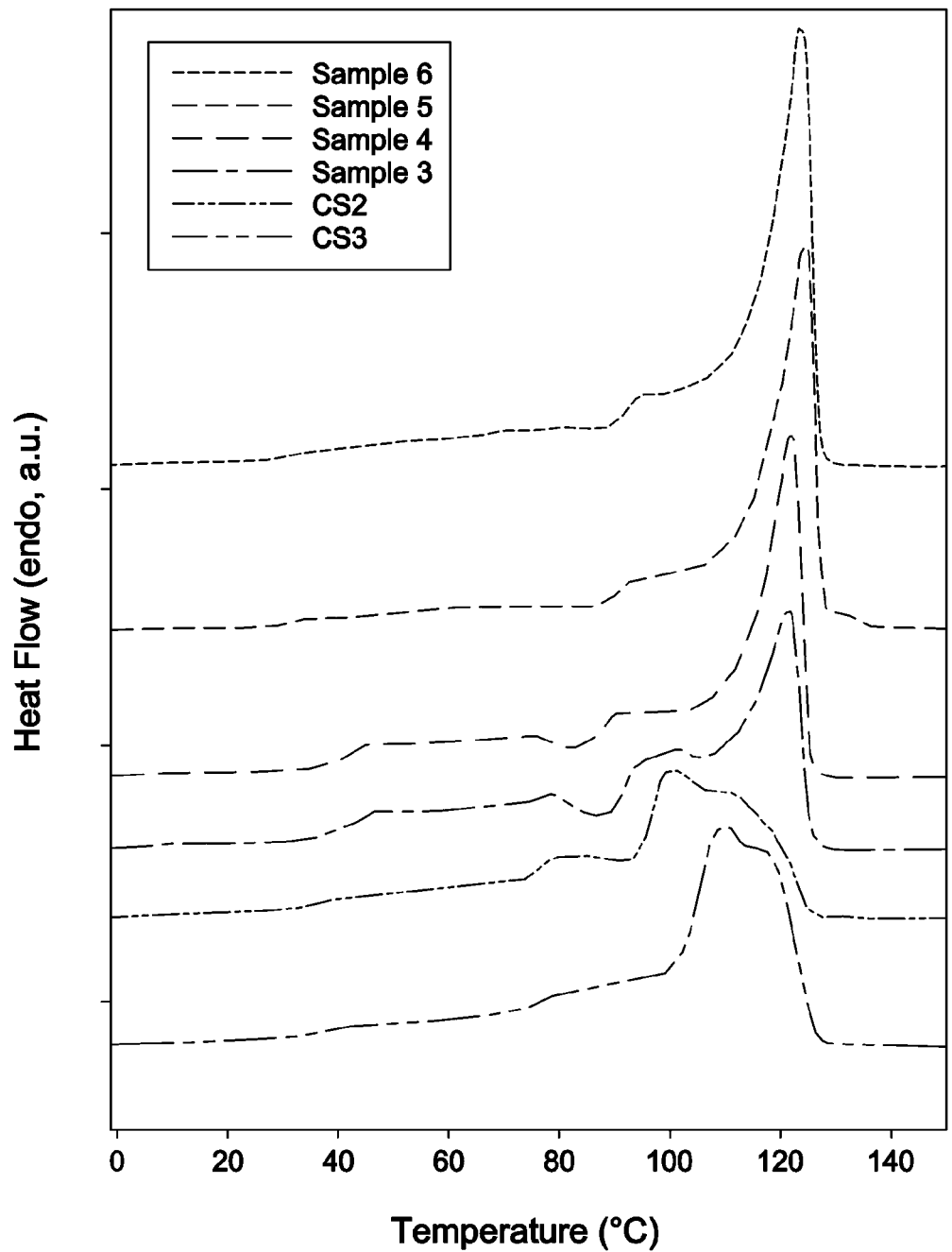
FIG. 2 presents differential scanning calorimetry results for embodiments of the inventive metallocene-produced copolymer described herein as compared to metallocene-produced copolymers of similar density and melt index.

FIG. 2 presents the DSC melting curves, first melt, for Samples 3-6, CS2, and CS3. The peak melting (first melt) temperature, T$_{max\ first\ melt}$, for the reactor granules of CS2 and CS3 was approximately 100.19° C. and 109.71° C., respectively, whereas T$_{max\ first\ melt}$ for the reactor granules of Samples 3 through 6 were at least 14 degrees higher for a given density. The onset of melting for CS2 and CS3 was approximately 92.2 and 99.3, respectively, whereas the onset of melting for Samples 3 through 6 was at least 108.4 degrees, approximately at least 9 degrees higher for a given density.

Example 3

Table 4 compares film properties of a metallocene resin produced with an embodiment of the metallocene catalyst described herein, Sample 7, to film properties of a comparable commercially available metallocene resin, Comparative Sample 4 (CS4, EXCEED™ 1018) Sample 7 was produced using [bis(n-propyl cyclopentadienyl)hafnium difluoride].

Each granular resin was dry-blended with 500 ppm Irganox 1076, 2000 ppm Weston 399 (both available from Ciba Chemicals) and 800 ppm FX5920A (processing aid available from Dynamar) using a double-cone blender. Pelletizing of the resins was carried out on a Werner & Pfleiderer ZSK 57 mm twin screw extruder. Output rate was 68.1 kg/h (150 lb/h) and the melt temperature was about 210° C.

To produce film, the resins were extruded into film using a 63.5 mm (2.5 inch) Battenfield Gloucester blown film line (30:1 L:D) equipped with a 15.24 mm (6 inch) oscillating die and a Future Design air ring. Output rate was 3.36 kg/mm (188 lb/in) (or 7 g/mm/mm (10 lb/in/in) die circumference). The die temperature was 200° C.

TABLE 4

| | Sample | |
|---|---|---|
| | 7 | CS4 |
| Grade | LLDPE film | EXCEED 1018CA film |
| Reactor Temperature | 85 | 80 |
| MI (I2) | 0.95 | 1.00 |
| HLMI (I21) | 19.06 | 15.8 |
| MFR (I21/I2) | 20.1 | 15.8 |
| Resin Density (g/cc) | 0.9180 | 0.9200 |
| Gauge Mic (m) | 19.30 | 19.30 |
| Tensile @ Yield (mPa) MD | 8.96 | 9.58 |
| Tensile @ Yield (mPa) TD | 9.51 | 9.58 |
| Ultimate Tensile (mPa) MD | 70.83 | 63.25 |
| Ultimate Tensile (mPa) TD | 50.23 | 57.53 |
| Ultimate Elongation (%) MD | 370 | 410 |
| Ultimate Elongation (%) TD | 590 | 630 |
| 1% Secant (mPa) MD | 178.24 | 176.94 |
| 1% Secant (mPa) TD | 210.57 | 197.95 |
| Puncture Force (kN/m) | 3150.00 | 2730.00 |
| Puncture Energy (kJ/m) | 237.63 | 201.14 |
| Elmendorf Tear (kN/m) MD | 123.20 | 119.35 |
| Elmendorf Tear (kN/m) TD | 180.95 | 177.10 |
| Dart Drop (Method A) (kN/m) | 361.90 | 234.85 |

The resin and film data were obtained according to the following testing protocols:

Melt Index (MI) (g/10 min): ASTM D-1238, condition 190° C.;
Density (g/cc): ASTM-D-4703-03 and ASTM-D-1505;
Dart Drop Impact F50 (g/mil): ASTM D-1709 A;
Elmendorf Tear (g/mil): ASTM D-1922;
Hot tack force (N/25 mm): ASTM F-1921
Secant Modulus (1%) (psi): ASTM D-882;
Tensile @ Yield (psi): ASTM D-882;
Ultimate Tensile (psi): ASTM D-882;
Ultimate Elongation (%): ASTM D-882

Sample 7 has a similar balance of MD tear strength, dart impact strength and 1% secant modulus as compared to CS4.

Example 4

Table 5 compares film properties of a metallocene resin produced with an embodiment of the metallocene catalyst described herein, Sample 8, to film properties of a comparable commercially available metallocene-catalyzed resin, Comparative Sample 5 (CS5, EXCEED™ 1018). Sample 8 was also produced using [bis(n-propyl cyclopentadienyl) hafnium difluoride]. Film production was the same as described in Example 3. Resin and film data were obtained according to the testing protocols described in Example 3. Sample 8 has a superior balance of MD tear strength, dart impact strength and 1% secant modulus as compared to CS5.

TABLE 5

| | Sample | |
|---|---|---|
| | 8 | CS5 |
| Grade | LLDPE film | EXCEED 1018CA film |
| Reactor Temperature | 77 | 80 |
| MI (I2) | 0.95 | 1.00 |
| HLMI (I21) | 32.63 | 15.8 |
| MIR (I21/I2) | 34.3 | 15.8 |
| Resin Density (g/cc) | 0.9212 | 0.9200 |
| Gauge Mic (m) | 20.07 | 19.30 |
| Tensile @ Yield (mPa) MD | 10.47 | 9.58 |
| Tensile @ Yield (mPa) TD | 11.78 | 9.58 |
| Ultimate Tensile (mPa) MD | 64.42 | 63.25 |

TABLE 5-continued

| | Sample | |
|---|---|---|
| | 8 | CS5 |
| Ultimate Tensile (mPa) TD | 44.44 | 57.53 |
| Ultimate Elongation (%) MD | 320 | 410 |
| Ultimate Elongation (%) TD | 620 | 630 |
| 1% Secant (mPa) MD | 215.17 | 176.94 |
| 1% Secant (mPa) TD | 283.04 | 197.95 |
| Puncture Force (kN/m) | 2730.00 | 2730.00 |
| Puncture Energy (kJ/m) | 201.14 | 201.14 |
| Elmendorf Tear (kN/m) MD | 211.75 | 119.35 |
| Elmendorf Tear (kN/m) TD | 215.60 | 177.10 |
| Dart Drop (Method A) (kN/m) | 211.75 | 234.85 |

As illustrated in Examples 3 and 4 above, while the peak melting temperature of resins produced with embodiments of the metallocene described herein is substantially higher than that of typical metallocene produced resins, reactor conditions may be chosen so that key film and resin properties are substantially identical to or substantially improved over typical metallocene produced resins.

Example 5

Table 6 compares film properties of metallocene resins produced with an embodiment of the metallocene catalyst described herein, Samples 9-12, to film properties of a comparable commercially available metallocene-catalyzed resin, Comparative Sample 6 (CS6, EXCEED™ 1012CA). Samples 9-12 were also produced using [bis(n-propyl cyclopentadienyl)hafnium difluoride]. Film production was the same as described above in Example 3. Resin and film data were obtained according to the testing protocols described above in Example 3.

Heat seal and hot tack measurements were made according to the following procedure. The films were conditioned for heat seal and hot tack measurements by aging the samples for at least 40 hours at 23° C. and 50% humidity before testing. A Heatsealer (Model PC, available from Theller) was used to measure the heat seal characteristics of the films. The samples were cut into 20.3 cm by 15.2 cm (8 inch by 6 inch) sheets and sandwiched between Mylar sheets so that the inside surfaces of the blown films were in contact. The seal was created by placing the Mylar-covered films were between 12.7 cm (5 inch) long seal bars and a pressure of 0.5 MPa (73 psi) was applied for 1.0 seconds. Seals were created at temperatures ranging from 75° C. to 150° C., and the seal length was approximately 25.4 mm (1 inch). The heat seals were then aged for a minimum of 24 hours at 23 C and 50% humidity and the seal strength was measured at a rate of 508 mm/min (20 inch/min) Hot tack curves were generated on a J&B Instruments hot tack tester using 15-mm wide film samples backed with 50 mm thick PET tape. The seal time and pressure was 0.5 s and 0.5 MPa, respectively. The seal strength was measured after 0.4 s delay time at a speed of 200 mm/min.

TABLE 6

| | Sample | | | | |
|---|---|---|---|---|---|
| | 9 | 10 | 11 | 12 | CS6 |
| Grade | VLDPE Film | VLDPE Film | VLDPE Film | VLDPE Film | EXCEED 1012CA |
| MI (I2) | 0.71 | 1.03 | 0.97 | 1.05 | 1.08 |
| MIR (I21/I2) | 32.7 | 32.4 | 25.9 | 25.6 | 16.1 |
| Resin Density (g/cc) | 0.9132 | 0.9133 | 0.9129 | 0.9137 | 0.9145 |
| $T_{75}$-$T_{25}$ (Resin) | 34.8 | 34.2 | 28.1 | 26.9 | 13.5 |
| $M_{60}$/$M_{90}$ (Resin) | 4.76 | 4.37 | 4.18 | 3.81 | 0.95 |
| Film Peak Melting Temp/° C. | 120.64 | 121.13 | 120.3 | 120.13 | 110.15 |
| Film Gauge (m) | 25.15 | 24.89 | 25.15 | 25.65 | 25.15 |
| Ultimate Tensile (MPa) MD | 64.56 | 63.25 | 66.56 | 66.97 | 68.69 |
| Ultimate Tensile (MPa) TD | 57.19 | 54.09 | 60.08 | 59.74 | 59.60 |
| Ultimate Elongation (%) MD | 390 | 460 | 430 | 490 | 520 |
| Ultimate Elongation (%) TD | 620 | 610 | 590 | 600 | 590 |
| 1% Secant (MPa) MD | 145.24 | 138.49 | 132.77 | 138.42 | 123.40 |
| 1% Secant (MPa) TD | 182.59 | 165.84 | 145.72 | 150.89 | 133.60 |
| Puncture Force (kN/m) | 2063.25 | 1855.00 | 2082.50 | 1785.00 | 1767.50 |
| Puncture Energy (kJ/m) | 171.33 | 156.64 | 197.14 | 160.20 | 155.31 |
| Elmendorf Tear (kN/m) MD | 80.85 | 84.70 | 84.70 | 88.55 | 88.55 |
| Elmendorf Tear (kN/m) TD | 138.60 | 138.60 | 127.05 | 134.75 | 130.90 |
| Dart Drop (Method A) (kN/m) | 292.60 | 311.85 | 288.75 | 257.95 | 227.15 |
| Heat seal Initiation (° C.) | 75 | 75 | No data | 75 | 85 |
| Maximum Hot Tack Force (N/25 mm) | 18.00 | 16.72 | No data | 16.51 | 15.94 |
| Hot Tack Temp at 6 N/25 mm | 81 | 77 | No data | 81 | 92 |
| Hot tack window at 6 N/25 mm | 26 | No data | No data | 26 | 17 |
| Haze (%) | 13.1 | 23.7 | 12.3 | 13.6 | 5.9 |
| Clarity (%) | 98.0 | 93.6 | 97.6 | 97.3 | 98.9 |
| Hexane Extractables (%) | 0.46 | 0.65 | 0.46 | No data | 0.41 |

The resins described herein show a BOCD evidenced by $T_{75}$-$T_{25}$ values of greater than 20 and $M_{60}$/$M_{90}$ values of greater than 1, while the comparative resins CS6 shows a narrow composition distribution indicated by a $T_{75}$–$T_{25}$ value of less than 20 and a homogenous distribution of the comonomer distribution across the different molecular weights indicated by a $M_{60}/M_{90}$ value of close to 1. FIGS. 9-13 graphically represent the TREF-LS data of the resins used to produce samples 9, 10, 11 12 and CS6 further exemplifying the BOCD nature of the resins described herein.

Figure 3:
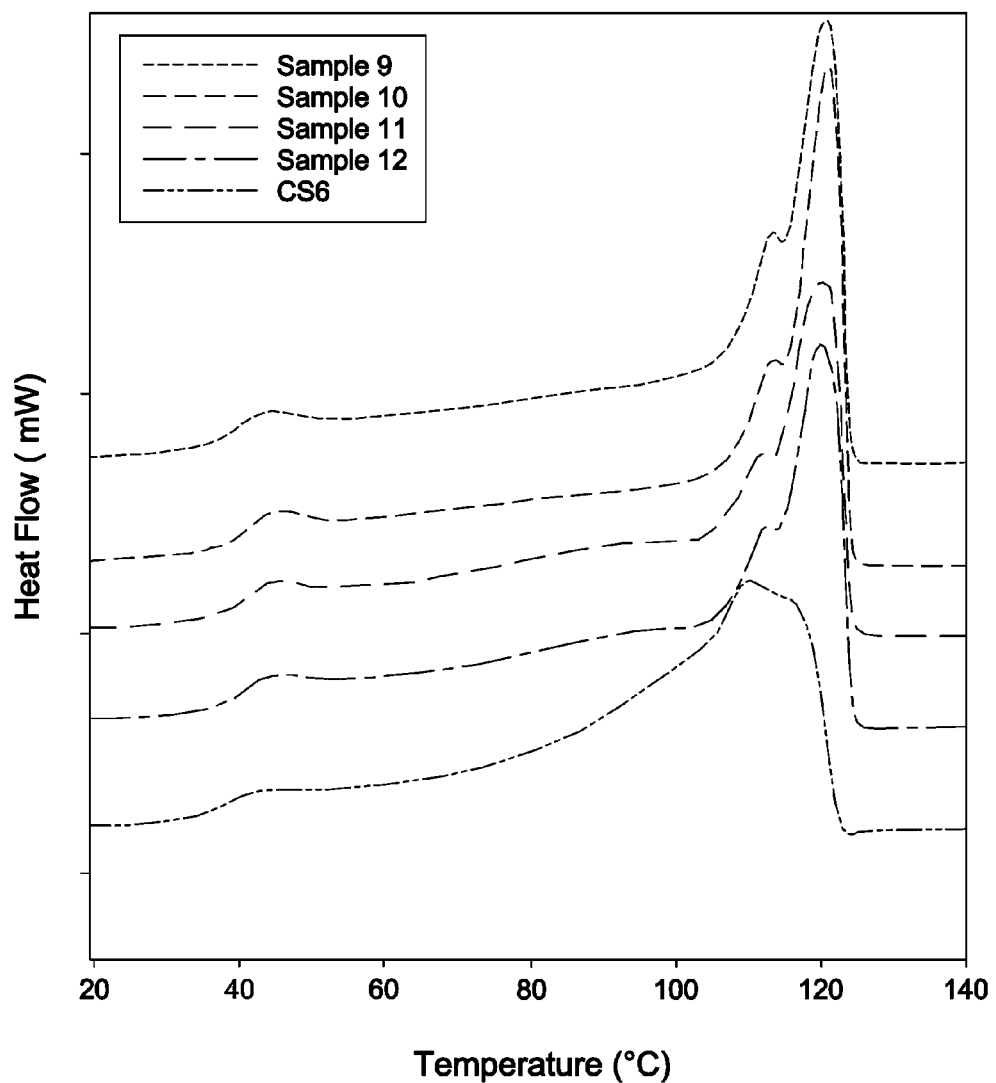
FIG. 3 presents differential scanning calorimetry results for embodiments of the inventive metallocene-produced copolymer described herein as compared to metallocene-produced copolymers of similar density and melt index.

FIG. 3 presents the DSC melting curves, first melt, for Samples 9-12, and CS6. The peak melting (first melt) temperature, $T_{max\,first\,melt}$, for film produced from the resin of CS6 was approximately 110.15° C., whereas $T_{max\,first\,melt}$, for film produced from the BOCD resins of Samples 9 through 12 were at least approximately 10 degrees higher for a similar density. The onset of melting for Samples 9 through 12 was also higher than the onset of melting for CS6.

Figure 4:
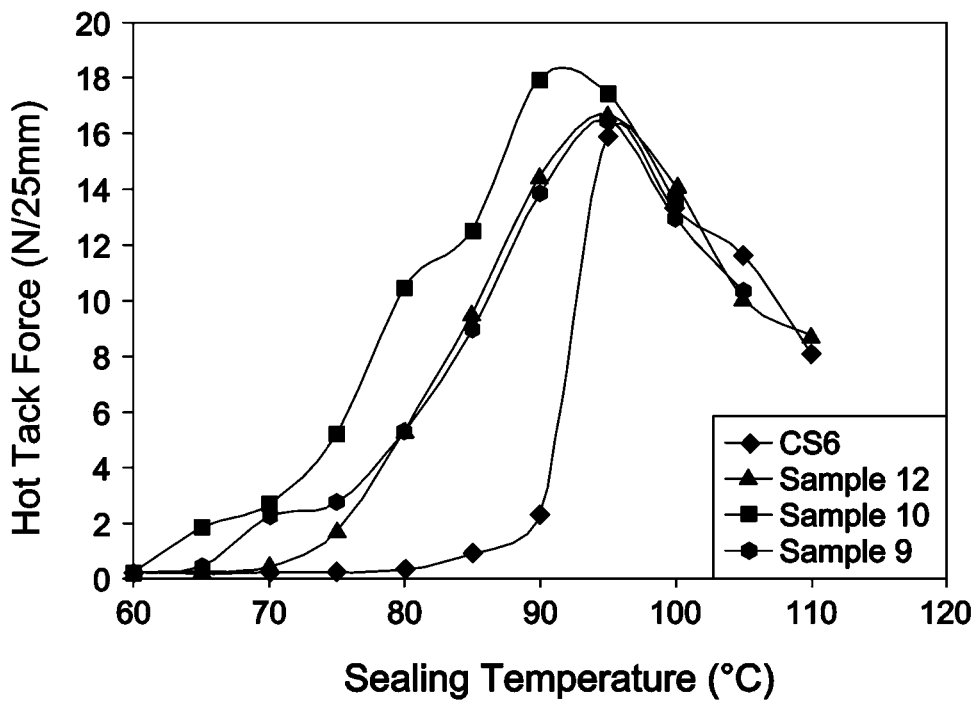
FIG. 4 presents hot tack properties for embodiments of the inventive metallocene-produced copolymer described herein as compared to metallocene-produced copolymers of similar density and melt index.

FIG. 4 graphically compares the hot tack force experimental results for Samples 9, 10, and 12 to the results for CS6, presenting the hot tack force as a function of temperature. The numerical hot tack force data given in Table 6 and the graphical representation presented in FIG. 4 indicate that films produced from BOCD resins described herein may result in improved hot tack force, improved maximum hot tack force, and/or increased hot tack temperature window at a force of 6N.

Figure 5:
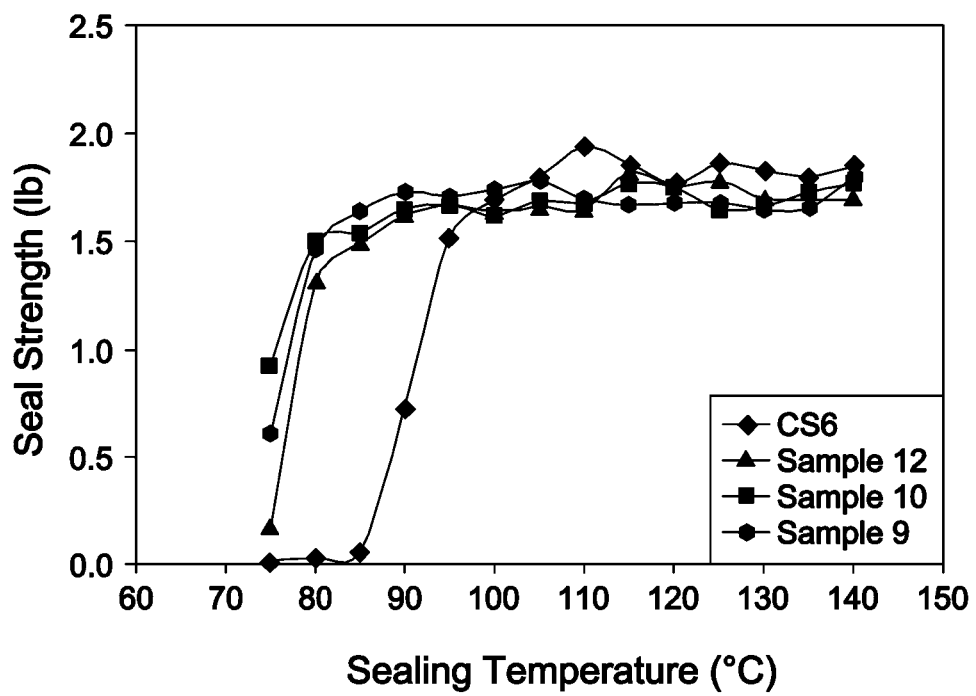
FIG. 5 presents heat seal strength results for embodiments of the inventive metallocene-produced copolymer described herein as compared to metallocene-produced copolymers of similar density and melt index.

FIG. 5 presents the heat seal strength as a function of temperature for samples 9, 10, 12 and CS6. FIG. 5 and the numerical values in Table 6 demonstrate that the films produced from BOCD resins described herein exhibit a heat seal initiation temperature of that is about 10° C. lower than the heat seal initiation temperature of the comparative sample, CS6.

The stiffness of films produced from BOCD resins described herein is increased by at least 5% as evidenced by the 1% secant modulus.

The hexane extractables content of films the BOCD resins is advantageously low and meets the FDA requirement of method 21 C.F.R. 177.1520 of less than 2 percent.

Resins described herein yield films that show a number of advantageously improved properties over comparable commercially available metallocene-catalyzed resins, for example, such as increased melt temperature, lower heat seal initiation temperature, improved hot tack force, improved stiffness and low hexane extractables content, among others. To illustrate these advantages, if the composition distribution was broad but not orthogonal, the hexane extractables content may be increased to unacceptable levels and the hot tack and heat seal initiation temperature may disadvantageously be increased. If the composition distribution was too narrow, the melting point may be decreased and the hot tack and heat seal initiation temperature may disadvantageously be increased.

Example 6

Table 7 compares film properties of blends of BOCD metallocene resins produced with an embodiment of the metallocene catalyst described herein, Samples 13-16, to film properties of a comparable commercially available metallocene-catalyzed resin, Comparative Sample 7 (CS7, EXCEED™ 1012CA). The polymer blends were composed of 95% of the resins described in Example 5 with 5% LD 200.48 (a low density polyethylene available from Exxon). Film production was the same as described above in Example 3. Resin and film data were obtained according to the testing protocols described above in Example 3. Heat seal and hot tack properties were measured as described in Example 5.

TABLE 7

| | Sample | | | | |
|---|---|---|---|---|---|
| | 13 | 14 | 15 | 16 | CS7 |
| Blend Composition | Sample 9 + 5% LD200 | Sample 10 + 5% LD200 | Sample 11 + 5% LD200 | Sample 11 + 5% LD200 | CS6 + 5% LD200 |
| Film Peak Melting Temp/° C. | 120.30 | 120.47 | 119.63 | 120.13 | 110.15 |
| Film Gauge (m) | 25.40 | 25.65 | 24.89 | 25.15 | 25.40 |
| Ultimate Tensile (MPa) MD | 66.56 | 66.35 | 66.01 | 60.15 | 68.62 |
| Ultimate Tensile (MPa) TD | 54.57 | 55.46 | 60.08 | 54.43 | 63.11 |
| Ultimate Elongation (%) MD | 400 | 450 | 450 | 460 | 530 |
| Ultimate Elongation (%) TD | 610 | 590 | 620 | 590 | 660 |
| 1% Secant (MPa) MD | 161.29 | 158.88 | 149.38 | 148.00 | 139.73 |
| 1% Secant (MPa) TD | 240.32 | 231.99 | 205.80 | 207.77 | 170.11 |
| Puncture Force (kN/m) | 2112.25 | 2065.00 | 2047.50 | 1785.00 | 1627.50 |
| Puncture Energy (kJ/m) | 187.12 | 177.56 | 194.91 | 145.29 | 133.95 |
| Elmendorf Tear (kN/m) MD | 46.20 | 57.75 | 73.15 | 77.00 | 80.85 |
| Elmendorf Tear (kN/m) TD | 138.60 | 150.15 | 138.60 | 154.00 | 154.00 |
| Dart Drop (Method A) (kN/m) | 319.55 | 234.85 | 269.50 | 257.95 | 165.55 |
| Heat seal Initiation (° C.) | 75 | 75 | No data | 80 | 90 |
| Maximum Hot Tack Force (N/25 mm) | 17.47 | 18.85 | No data | 16.81 | 13.43 |
| Temperature at Hot Tack of 6 N/25 mm | 84 | 84 | No data | 90 | 97 |
| Haze (%) | 5.6 | 5.3 | 3.5 | 3.6 | 1.9 |
| Clarity (%) | 99.2 | 99.0 | 99.4 | 99.4 | 99.5 |

Figure 6:
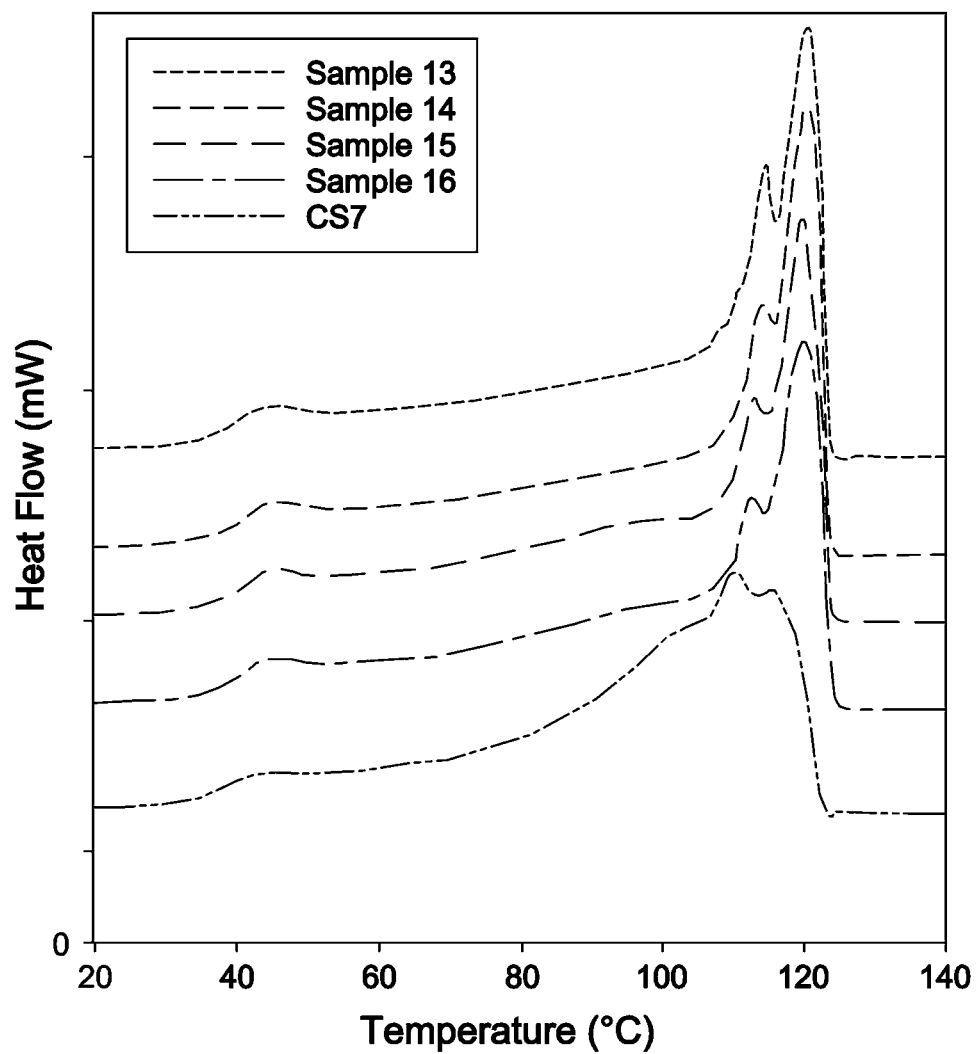
FIG. 6 presents differential scanning calorimetry results for blends containing embodiments of the inventive metallocene-produced copolymer described herein as compared to metallocene-produced copolymers of similar density and melt index.

FIG. 6 presents the DSC melting curves, first melt, for Samples 13-16, and CS7. The peak melting (first melt) temperature, $T_{max\,first\,melt}$, for films produced from the blend of CS7 was approximately 110.15° C., whereas $T_{max\,first\,melt}$, for the films produced from blends of Samples 9 through 12 were at least approximately 8.5 degrees higher for a similar density. The onset of melting for Samples 13 through 16 was also higher than the onset of melting for CS7.

Figure 7:
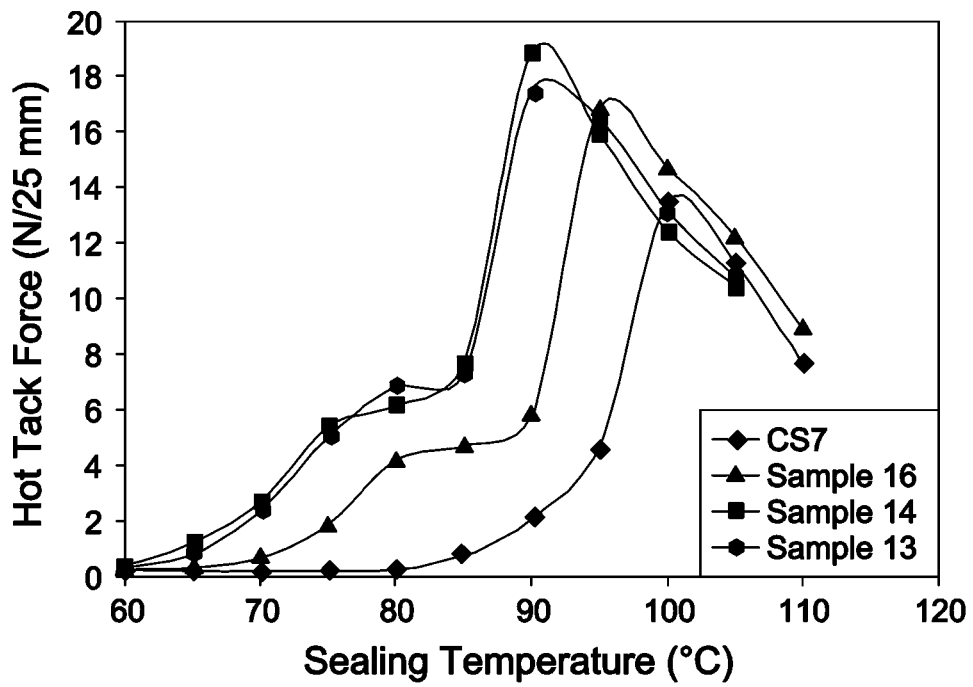
FIG. 7 presents hot tack properties for blends containing embodiments of the inventive metallocene-produced copolymer described herein as compared to metallocene-produced copolymers of similar density and melt index.
Figure 8:
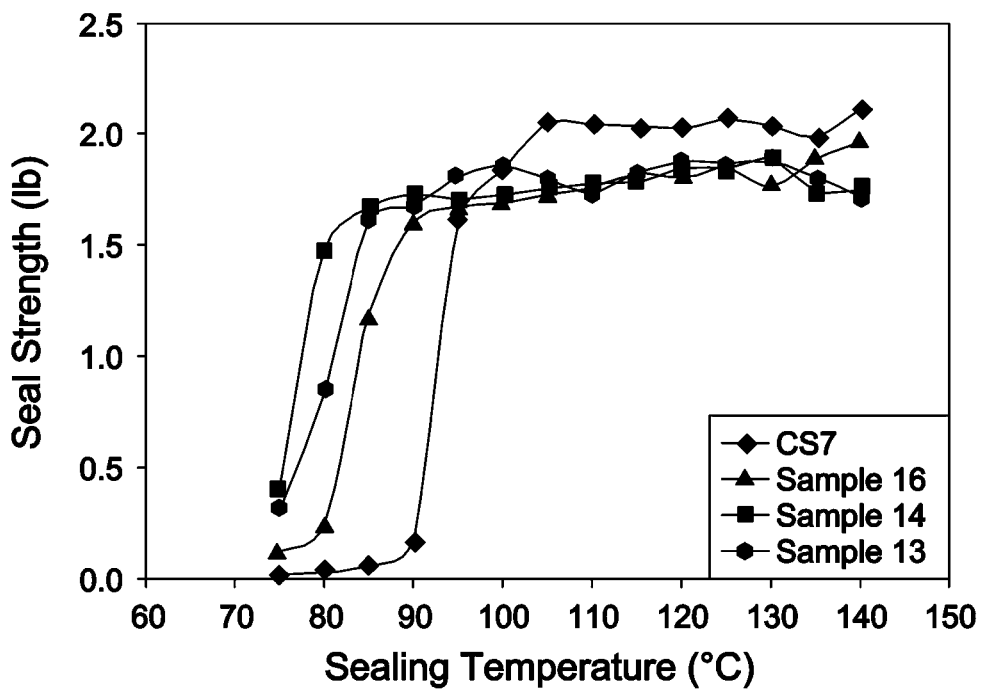
FIG. 8 presents heat seal strength results for blends containing embodiments of the inventive metallocene-produced copolymer described herein as compared to metallocene-produced copolymers of similar density and melt index.
Figure 9:
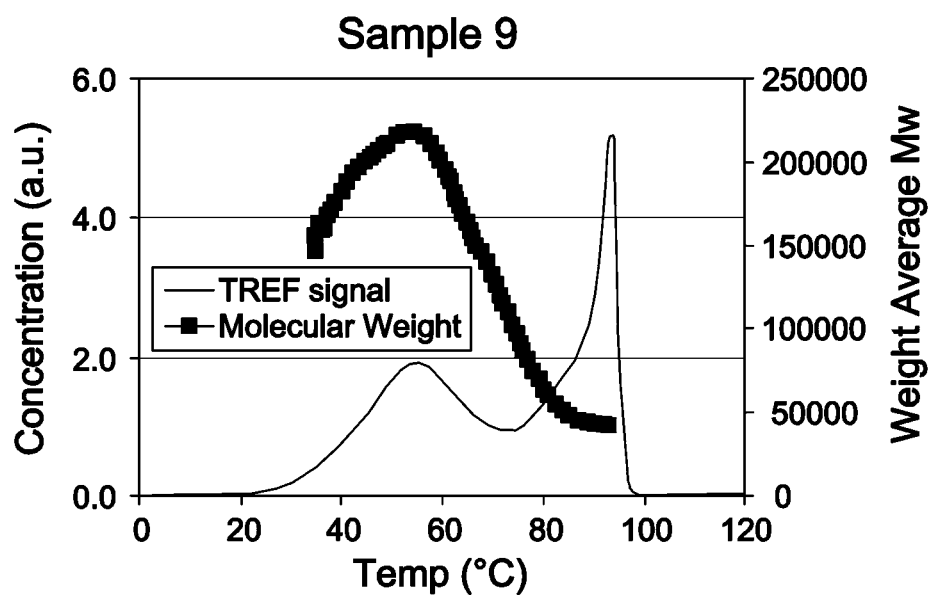
FIG. 9 presents the TREF-LS results obtained for Sample 9.
Figure 10:
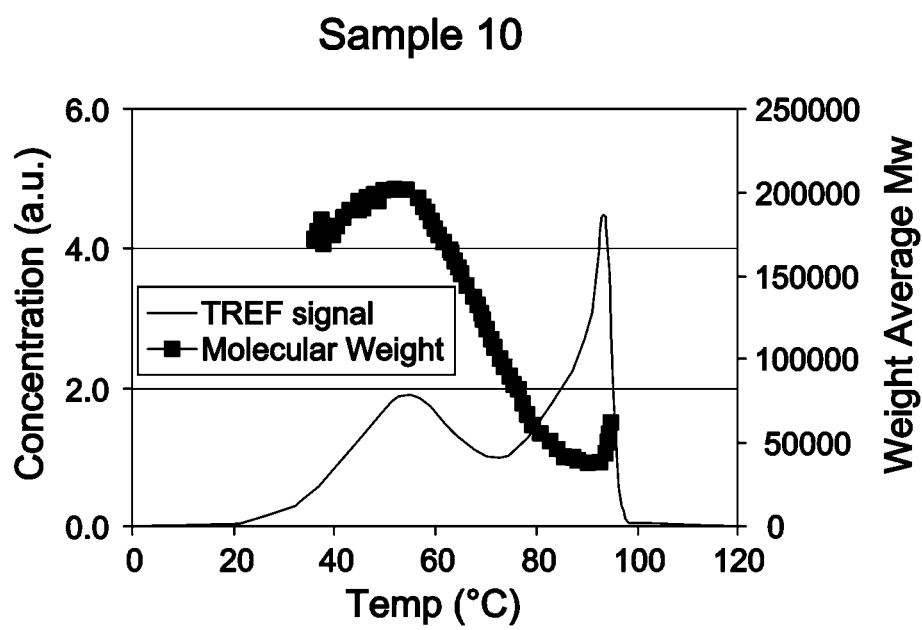
FIG. 10 presents the TREF-LS results obtained for Sample 10.
Figure 11:
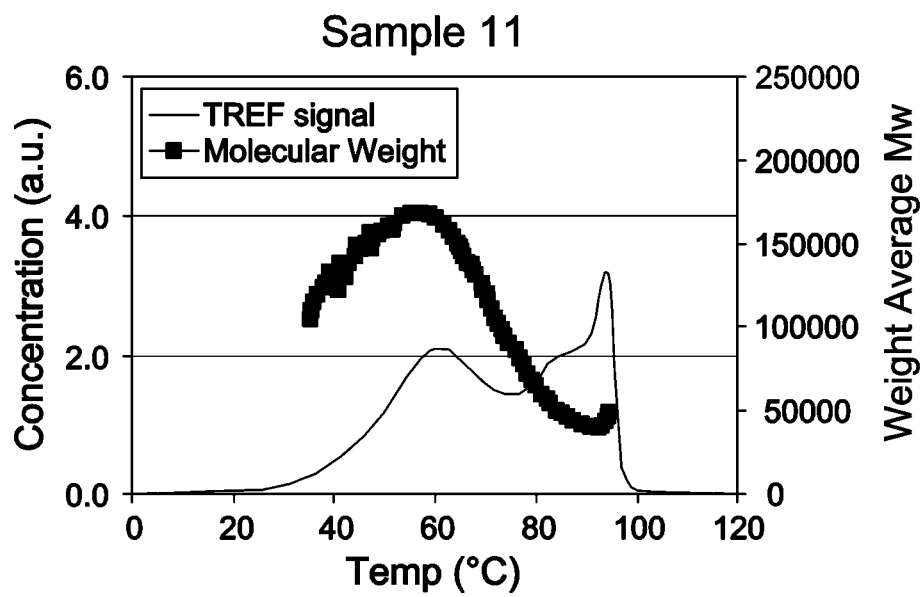
FIG. 11 presents the TREF-LS results obtained for Sample 11.
Figure 12:
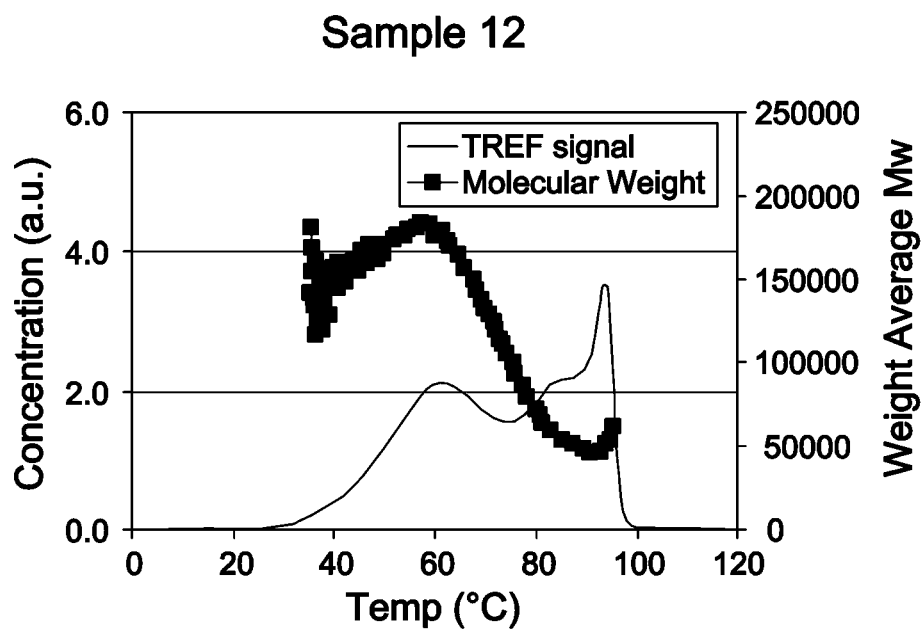
FIG. 12 presents the TREF-LS results obtained for Sample 12.
Figure 13:
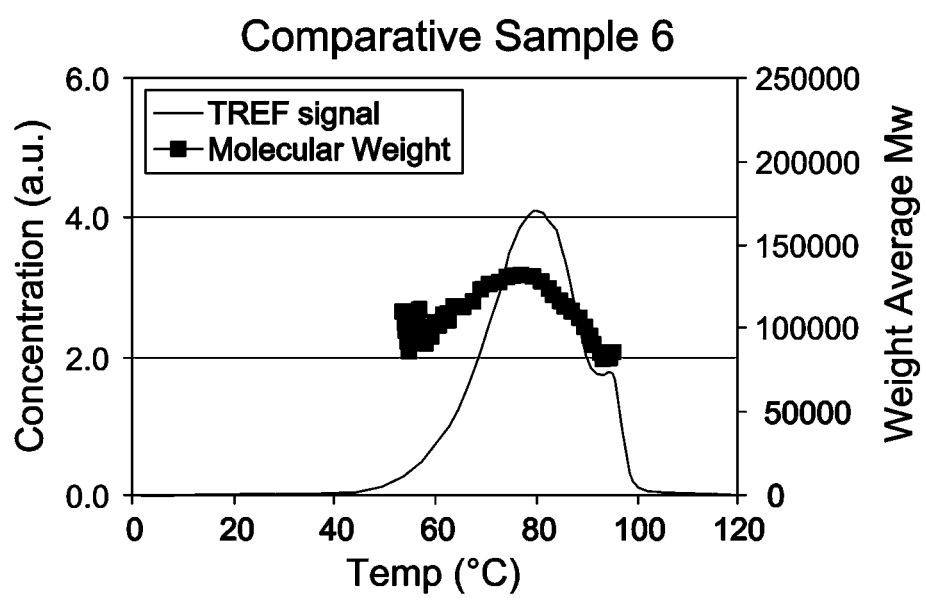
FIG. 13 presents the TREF-LS results obtained for comparative Sample CS6.

FIGS. 7 and 8 graphically compare the hot tack force experimental results for Samples 13, 14, and 16 to the results for CS7, presenting the hot tack force as a function of temperature. The results given in Table 7 and presented in FIGS. 6-8 indicate that films produced from blends containing the BOCD polymer resins described herein may result in improved peak melting temperatures as well as improvements in other properties, including 1% secant, puncture, dart drop, heat seal temperature, hot tack force, maximum hot tack force, and hot tack temperature at a force of 6N, among others.

Advantageously, in at least one embodiment, the present invention provides for a metallocene catalyst system useful for the production of a polyethylene having a broad orthogonal composition distribution (BOCD).

Films produced from BOCD resins described herein show a number of advantageously improved properties over comparable commercially available metallocene-catalyzed resins, for example, such as increased melt temperature, lower heat seal initiation temperature, improved hot tack force and improved stiffness, among others. Additionally, the metallocene catalyst system may allow improved separations, yielding a polymer suitable for many applications having stringent FDA standards for polymer extractables content.

The catalyst system may also be used for the production of polyethylenes having improved physical and chemical properties as well as enhanced processability. The polymers produced may advantageously yield resins having improved film properties, including improved tear properties, impact strength, and other physical properties.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

All priority documents are herein fully incorporated by reference for all jurisdictions in which such incorporation is permitted. Further, all documents cited herein, including testing procedures, are herein fully incorporated by reference for all jurisdictions in which such incorporation is permitted to the extent such disclosure is consistent with the description of the present invention.

What is claimed is:

1. An ethylene alpha-olefin copolymer having:
   a. a density D of 0.927 g/cc or less;
   b. a melt flow index $I_2$, from 0.1 to 80 g/10 min;
   c. a molecular weight distribution from 1.5 to 5.0;
   d. a peak melting temperature $T_{max\,second\,melt}$ satisfying the following relation:

$T_{max\,second\,melt} > D*398 - 245$;

e. a $T_{75}-T_{25}$ value of greater than 20, wherein $T_{25}$ is the temperature at which 25 mass % of the eluted polymer is obtained and $T_{75}$ is the temperature at which 75 mass % of the eluted polymer is obtained in a TREF experiment; and
   f. a $M_{60}/M_{90}$ value of greater than 1, wherein $M_{60}$ is the molecular weight of the polymer fraction that elutes at 60° C. and $M_{90}$ is the molecular weight of the polymer fraction that elutes at 90° C. in a TREF-LS experiment.

2. The copolymer of claim 1, wherein the copolymer has a peak melting temperature $T_{max\,second\,melt}$ satisfying the following relation:

$T_{max\,second\,melt} > D*398 - 242$.

3. The copolymer of claim 1, wherein the copolymer has a density from 0.900 to 0.927 g/cc.

4. The copolymer of claim 1, wherein the copolymer has a density from 0.900 to 0.918 g/cc.

5. The copolymer of claim 1, wherein the copolymer has a density from 0.918 to 0.927 g/cc.

6. The copolymer of claim 1, wherein the copolymer has a melt flow ratio, $I_{21}/I_2$, from 5 to 50.

7. The copolymer of claim 1, where in the copolymer is obtained by contacting ethylene, at least one alpha-olefin, and a metallocene catalyst in a gas phase reactor.

8. A composition comprising the copolymer of claim 1.

9. A film comprising the copolymer of claim 1, wherein the film has an MD tear strength of 134 kN/m or greater, and a dart drop impact of 192.5 kN/m or greater.

10. The film of claim 9, wherein the film has an MD tear strength of 154 kN/m or greater.

11. The film of claim 9, wherein the film has a 1% MD secant modulus of 200 MPa or greater.

12. A film comprising an ethylene alpha-olefin copolymer wherein the ethylene alpha-olefin copolymer has:
   a. a density D from 0.900 g/cc and 0.927 g/cc;
   b. a peak melting temperature $T_{max\,second\,melt}$ satisfying the following relation:

$T_{max\,second\,melt} > D*398 - 245$;

c. a $T_{75}-T_{25}$ value of greater than 20, wherein $T_{25}$ is the temperature at which 25 mass % of the eluted polymer is obtained and $T_{75}$ is the temperature at which 75 mass % of the eluted polymer is obtained in a TREF experiment; and
   d. a $M_{60}/M_{90}$ value of greater than 1, wherein $M_{60}$ is the molecular weight of the polymer fraction that elutes at 60° C. and $M_{90}$ is the molecular weight of the polymer fraction that elutes at 90° C. in a TREF-LS experiment; and wherein the film has:
   a. an MD tear strength of 46.2 kN/m or greater;
   b. a dart impact strength of 192.5 kN/m or greater; and
   c. a heat seal initiation temperature of 85° C. or less.

13. The film of claim 12, wherein the film has an MD tear strength of 77 kN/m or greater.

14. The film of claim 12, wherein the film has an 1% secant modulus of 137.8 MPa or greater.

15. The film of claim 12, wherein the film has a hexane extractables content of 1.6% or less.

16. The film of claim 12, wherein the film has a hot tack force at 90° C. of 6 N/25 mm or greater.

17. The film of claim 12, wherein the film has a hot tack force at 85° C. of 6 N/25 mm or greater.

18. The film of claim 12, wherein the ethylene alpha-olefin copolymer has a peak melting temperature, $T_{max\,second\,melt}$, and a density, D, that satisfy the following relation:

$T_{max\,second\,melt} > D*398_{12} 242$.

19. The film of claim 12, wherein the film further comprises at least one other polymer, optionally, a high pressure low density polyethylene.

20. The film of claim 12, wherein the film comprises two or more layers.

* * * * *